March 16, 1954

J. E. BANCROFT 2,672,298

MACHINE FOR WINDING COILS

Filed May 17, 1950

INVENTOR.
JAMES E. BANCROFT
BY
Kenyon & Kenyon
ATTORNEYS

INVENTOR.
JAMES E. BANCROFT
BY
Kenyon & Kenyon
ATTORNEYS

March 16, 1954

J. E. BANCROFT 2,672,298

MACHINE FOR WINDING COILS

Filed May 17, 1950

INVENTOR.
JAMES E. BANCROFT
BY
Kenyon & Kenyon
ATTORNEYS

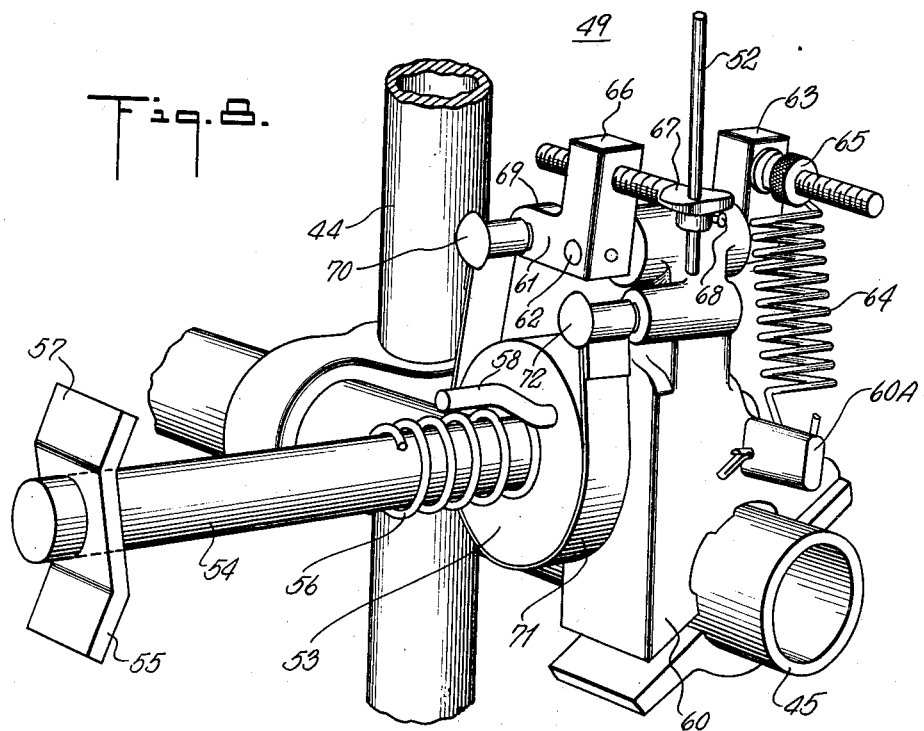

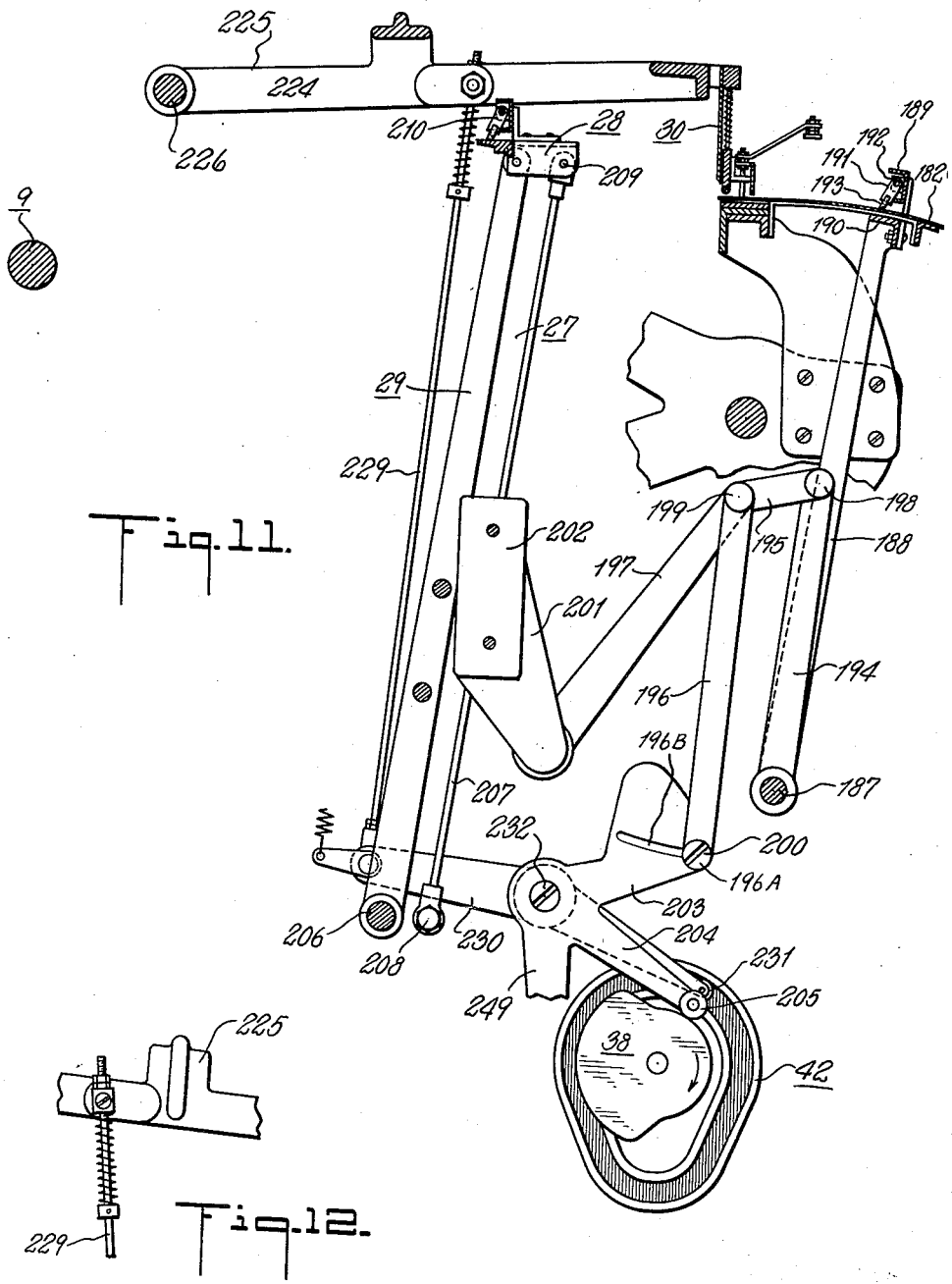

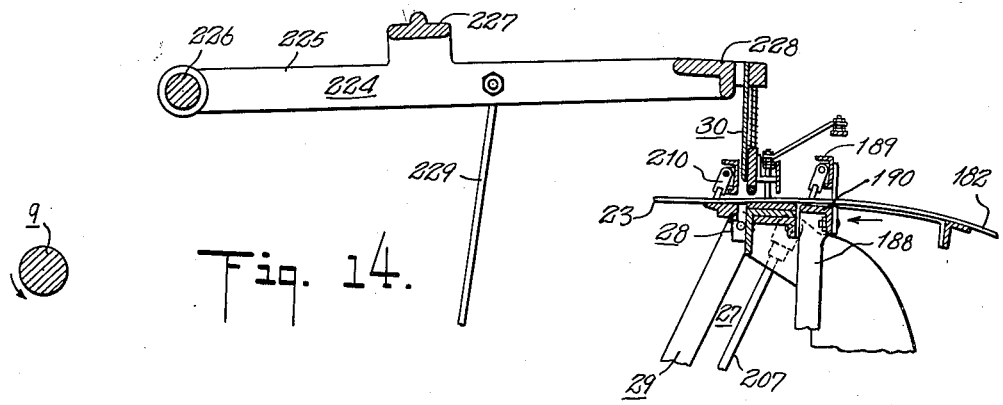
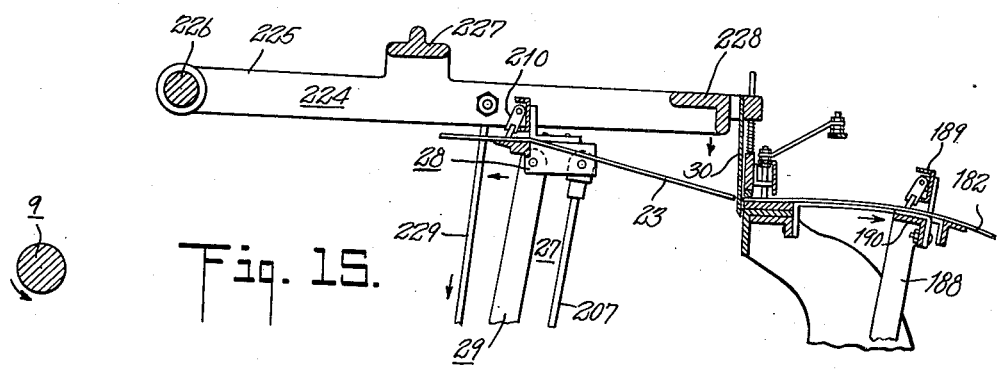
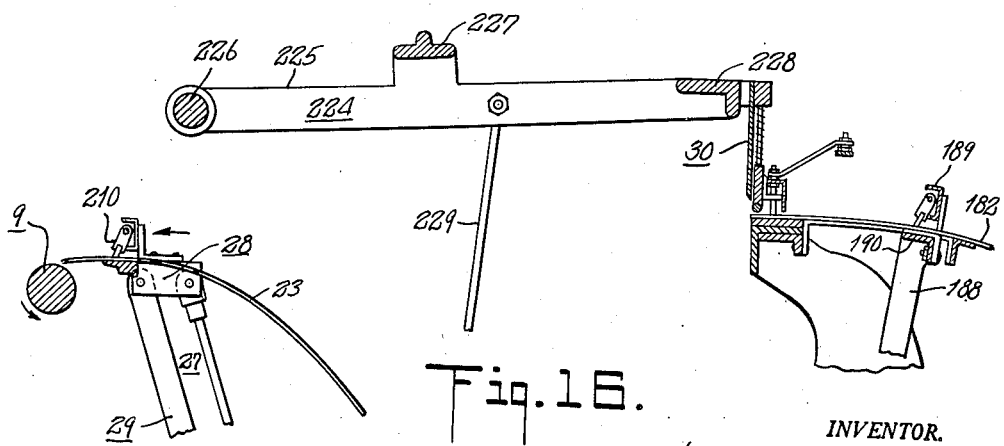

March 16, 1954
J. E. BANCROFT
2,672,298
MACHINE FOR WINDING COILS
Filed May 17, 1950
21 Sheets-Sheet 13
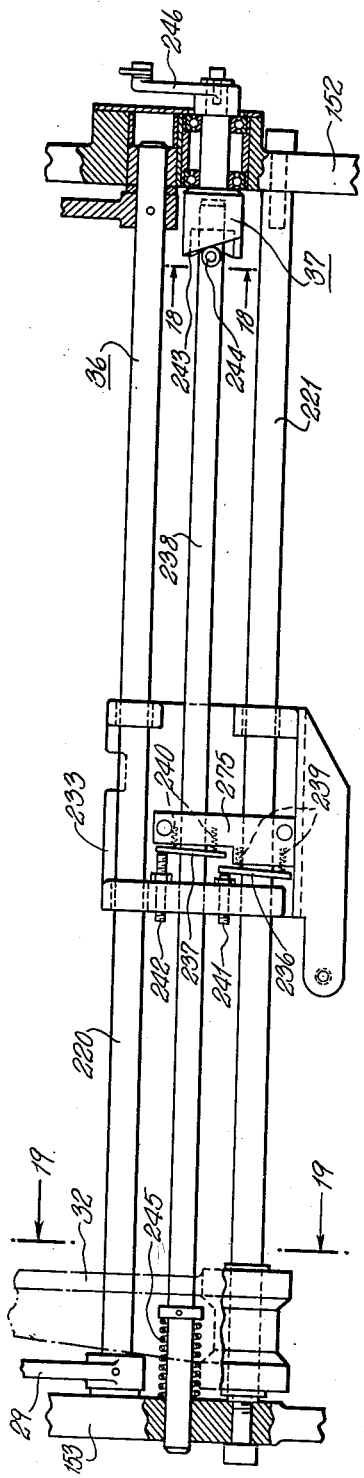
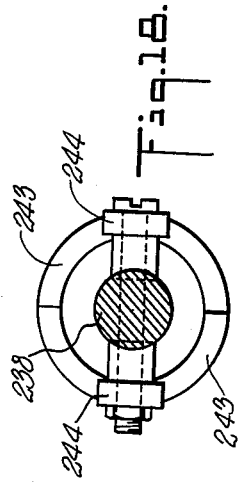
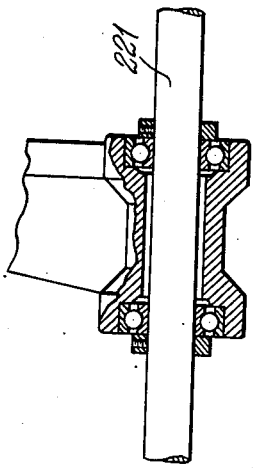
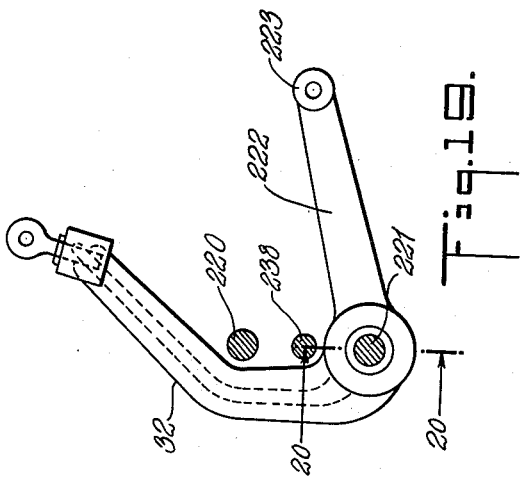
INVENTOR.
JAMES E. BANCROFT
BY
Kenyon & Kenyon
ATTORNEYS

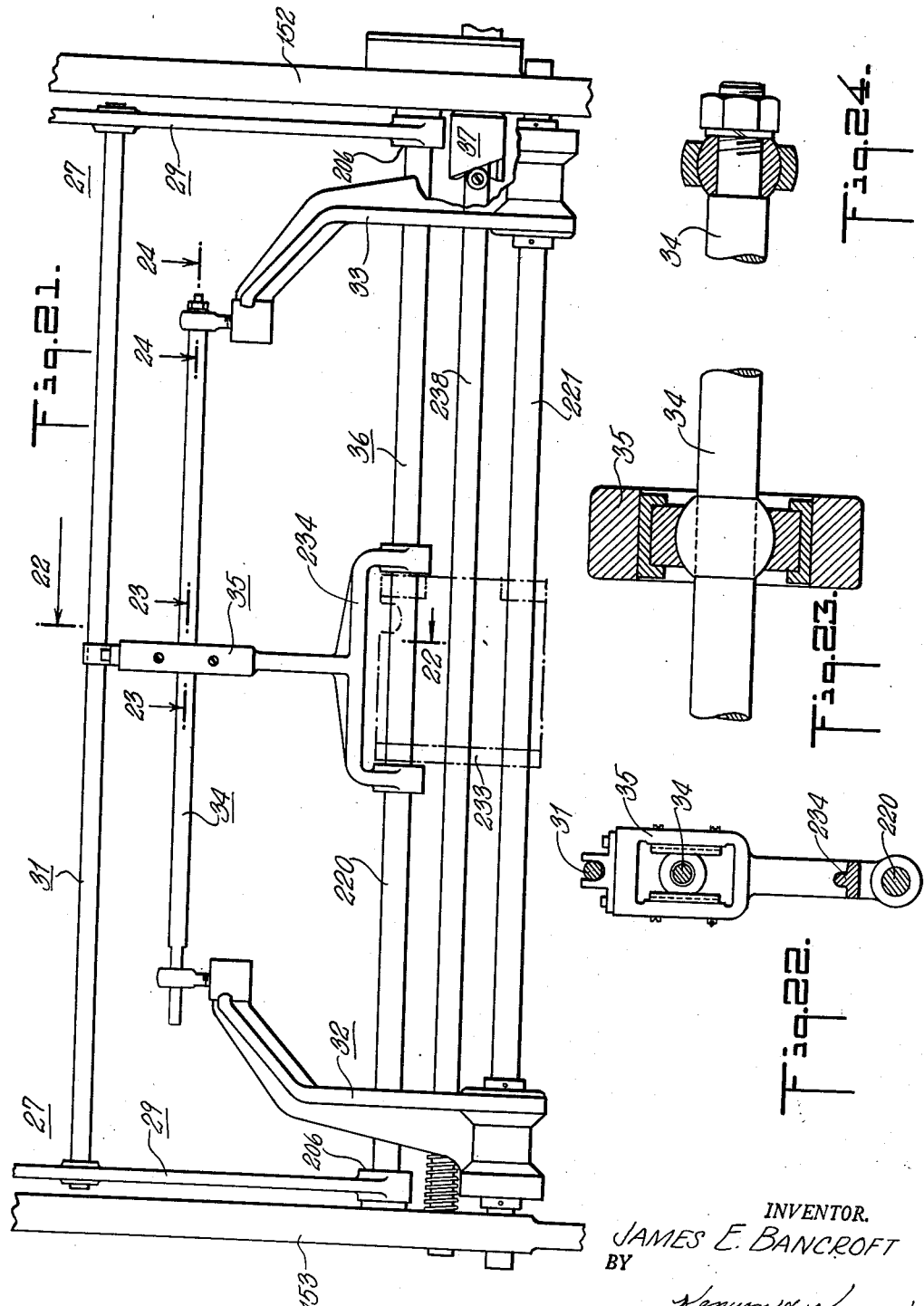

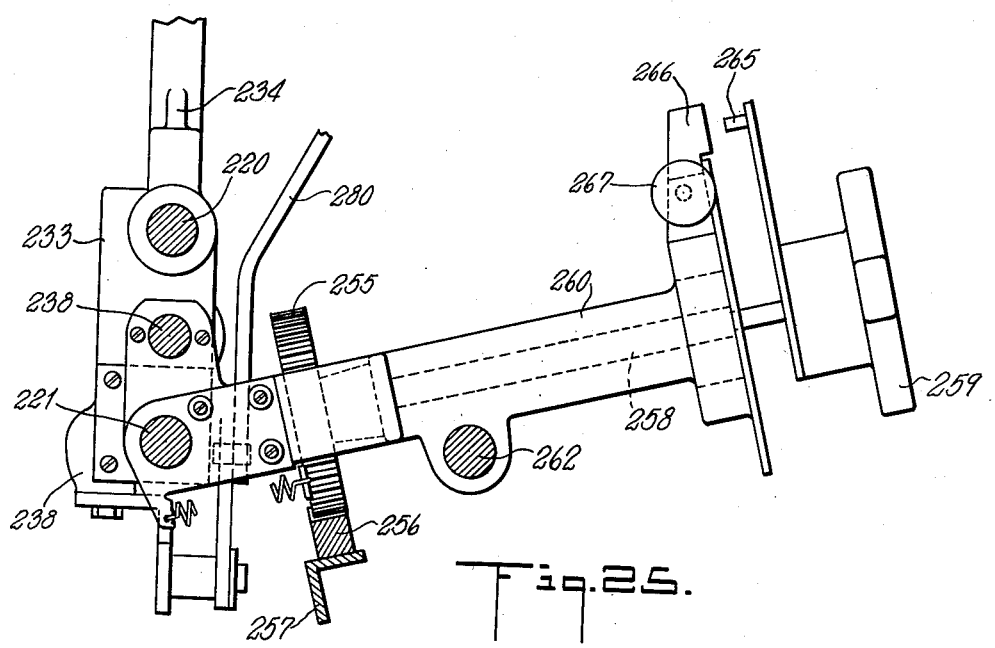
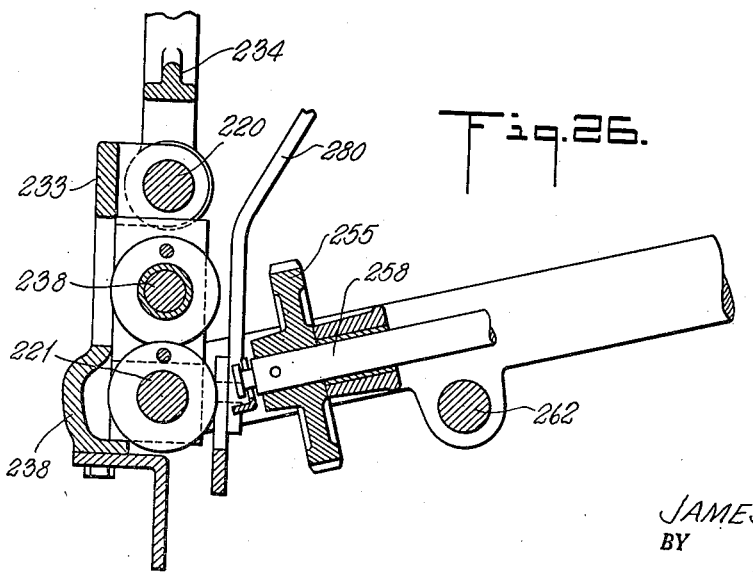

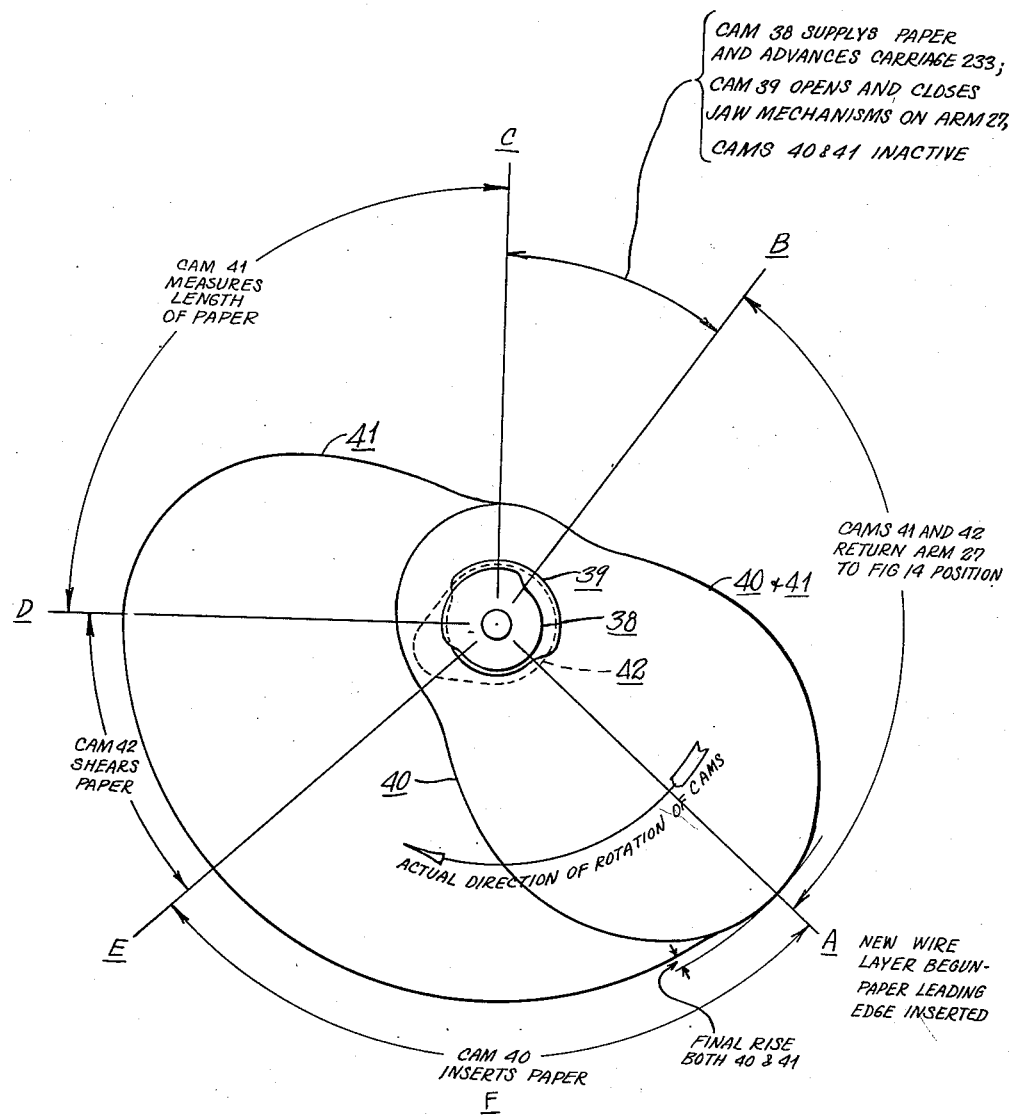

March 16, 1954
J. E. BANCROFT
2,672,298
MACHINE FOR WINDING COILS
Filed May 17, 1950
21 Sheets-Sheet 18
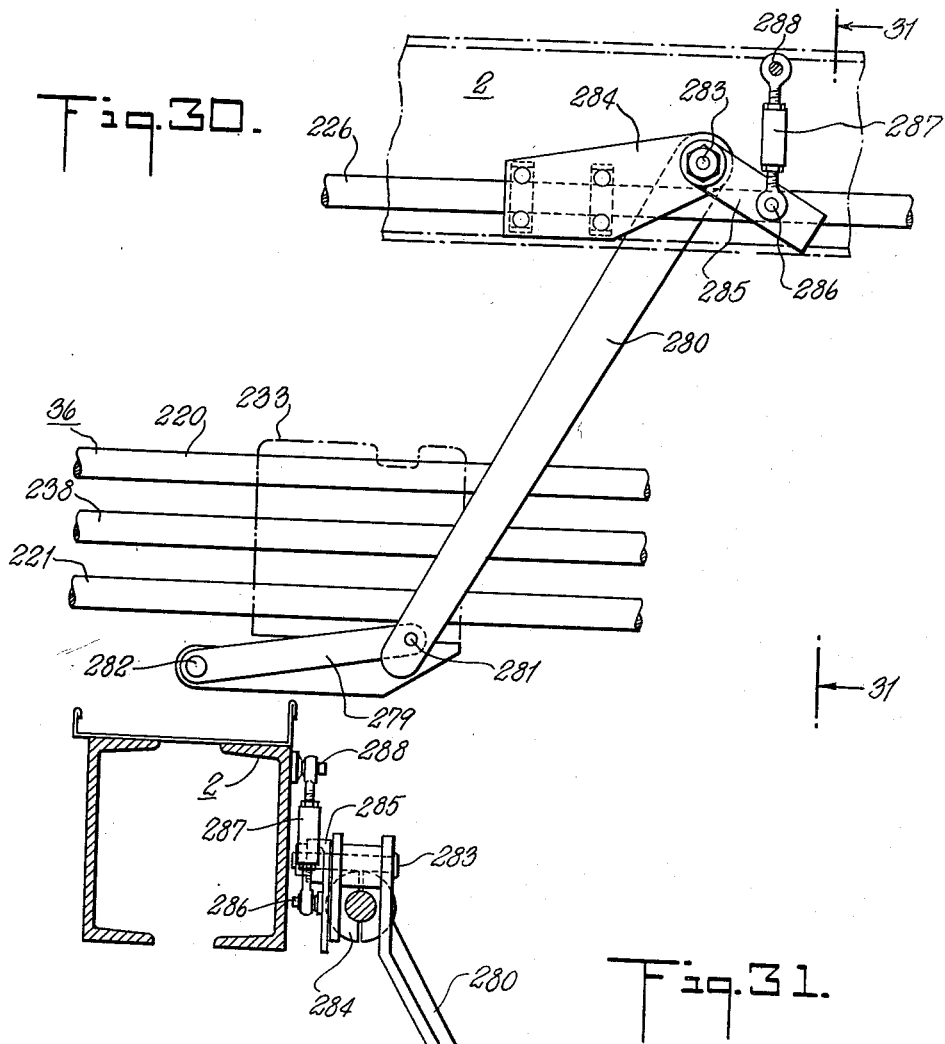
INVENTOR.
JAMES E. BANCROFT
BY
Kenyon & Kenyon
ATTORNEYS

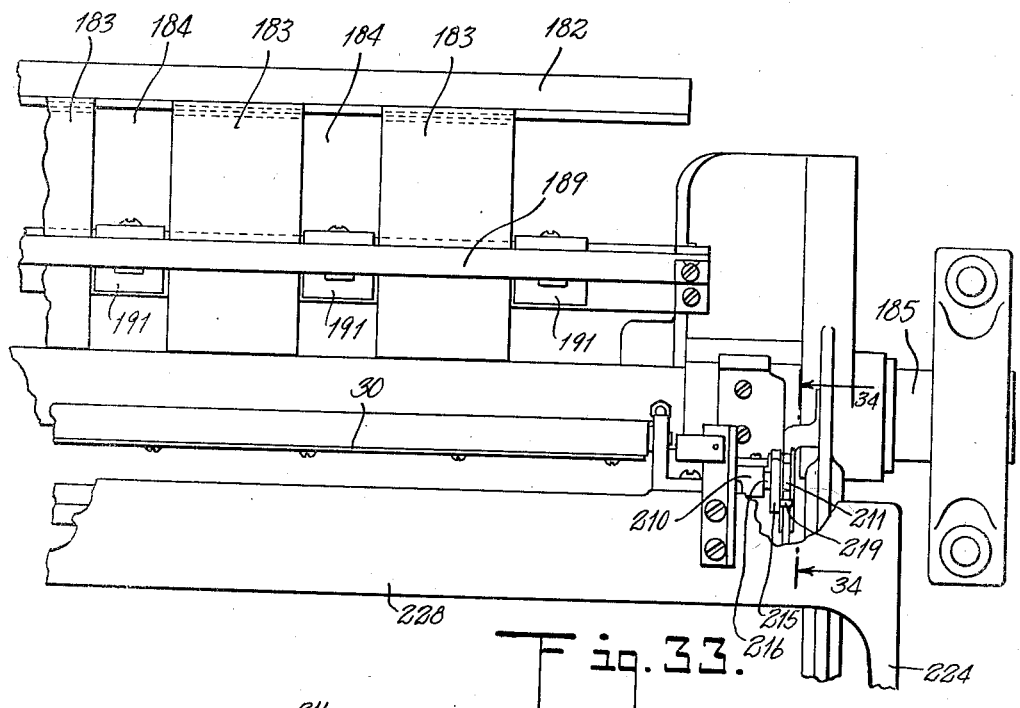
Fig. 33.
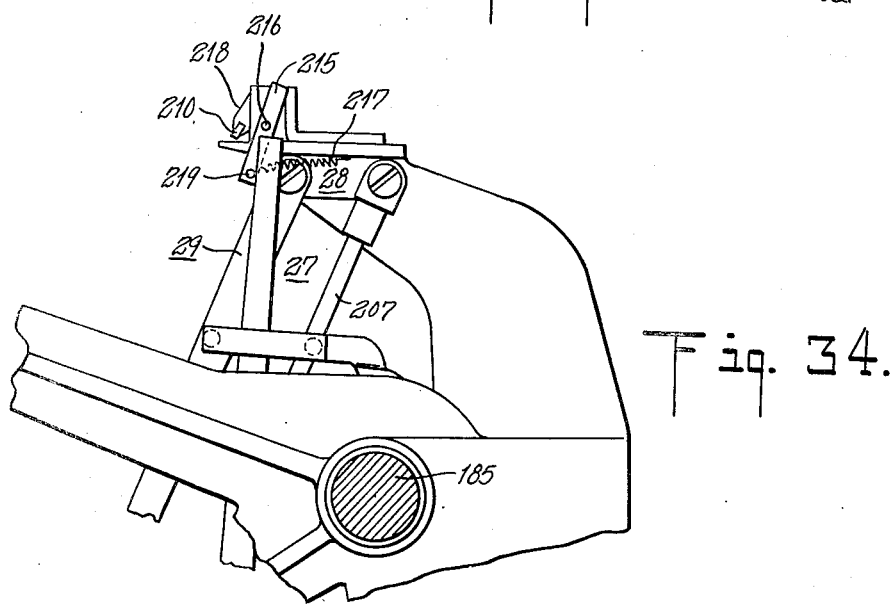
Fig. 34.
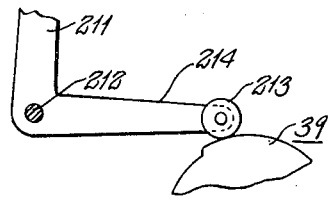
INVENTOR.
JAMES E. BANCROFT
BY
Kenyon & Kenyon
ATTORNEYS March 16, 1954 J. E. BANCROFT 2,672,298
MACHINE FOR WINDING COILS
Filed May 17, 1950 21 Sheets-Sheet 21

INVENTOR.
JAMES E. BANCROFT
BY
Kenyon & Kenyon
ATTORNEYS

Patented Mar. 16, 1954

2,672,298

UNITED STATES PATENT OFFICE 2,672,298

MACHINE FOR WINDING COILS

James E. Bancroft, Jamaica, N. Y., assignor to Allied Control Company, Inc., New York, N. Y., a corporation of New York Application May 17, 1950, Serial No. 162,491

42 Claims. (Cl. 242—10)

While useful in many related applications involving generally the winding of materials into coil form, the present invention finds particular usefulness for the winding of wire coils of the kind used extensively for multifarious functions in the electrical industry, for example, the electromagnetic coils of relays and like devices. It has for its general object the provision of new and improved methods and mechanisms for the rapid, economical and precision manufacture of coils particularly in large quantity production and with relatively unskilled personnel. To that end, it contemplates as particular objects the provision of one or more improvement features equivalent to the following, either individually or in various of the novel combinations of each other pointed out hereinafter:

An improved method and means exemplified by the structure and operation of the hereinafter described traverse and paper control mechanisms for winding multilayer coils comprising successive layers alternately of wound wire, sheet, or other material and of insulating paper or like material.

An improved method and means exemplified by the structure and operation of the hereinafter described paper control mechanisms for the automatic premeasuring and insertion of progressively increasing lengths of insulating paper or like material between the layers of wire or other material as the latter progressively increase in diameter.

An improved means exemplified by the hereinafter described traverse mechanisms for the precision winding of successive layers of spirally wound wire including improved devices for adjusting such means to accommodate different overall sizes of coils and wires of different diameters.

An improved means exemplified by the hereinafter described tensioning mechanisms for tensioning the wire prior to winding in order to insure that it may be wound uniformly and tightly in the finished coil.

Features associated with the foregoing which simplify all operations to the point where the machine may be effectively operated by relatively unskilled personnel and which, in general, minimize all possibility of defective production which might ordinarily arise from mishandling or inadvertence attributable to lack of skill.

Numerous detailed features for implementing the objects generally stated in the foregoing also comprise objects of the invention. These, however, will be better understood if consideration of them be put off to their proper place in the context of the description following hereinafter.

The feature of the invention upon which patent protection is sought are set forth in the appended claims. The invention itself together with all its objects and the advantages thereof will best be visualized by a reading of the following specification while referring to the annexed drawings which, together with the specification, illustrate a machine constituting one possible embodiment of the invention. In the drawings:

The Fig. 1 illustrates in perspective a view of the machine substantially in its entirety.

Figure 1:
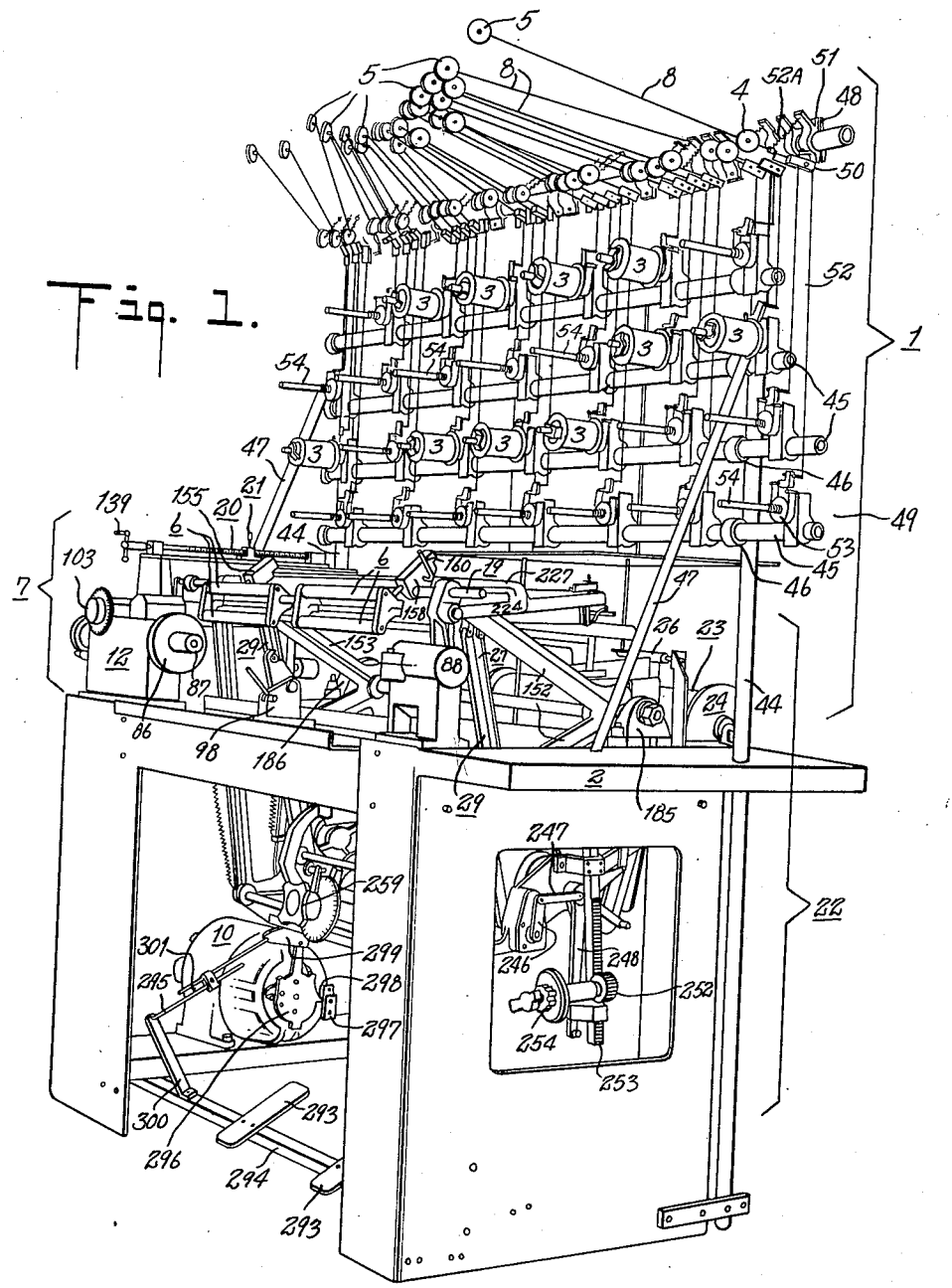
Figure 6:
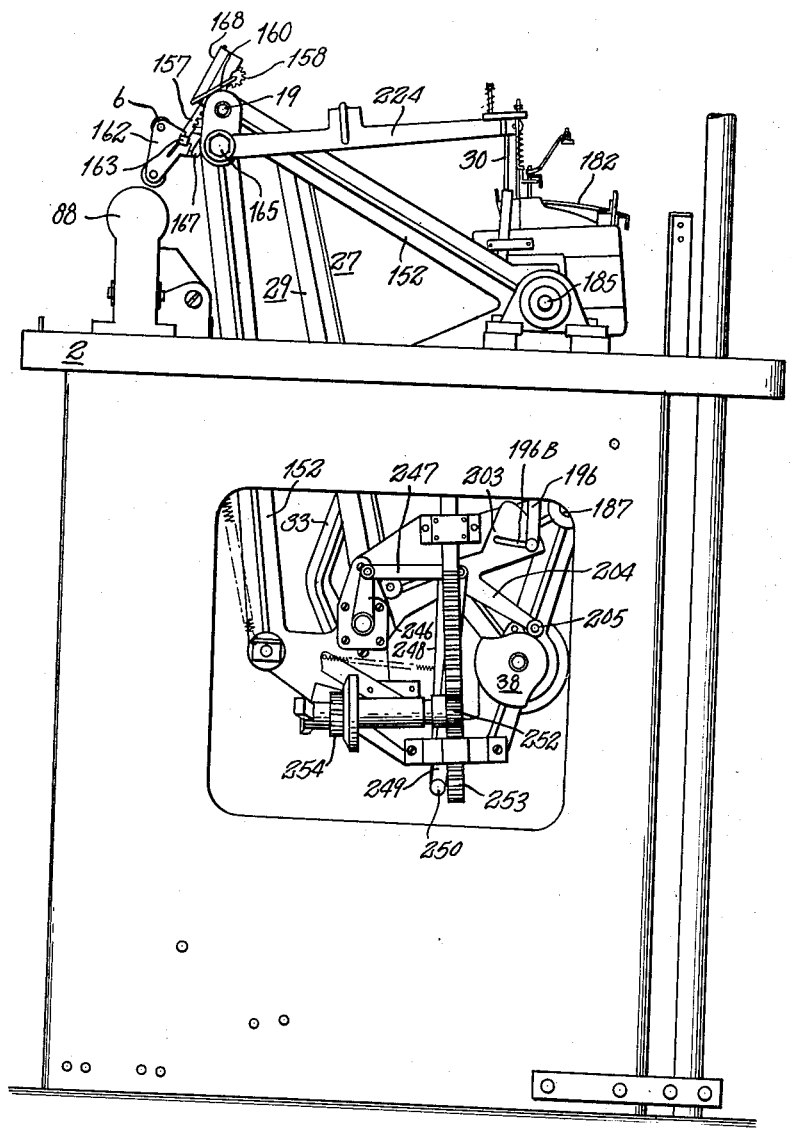
Fig. 6 is a partial view of the right side of the machine of Fig. 1 showing in particular certain details of the traverse mechanisms and the paper control mechanisms.
Figure 7:
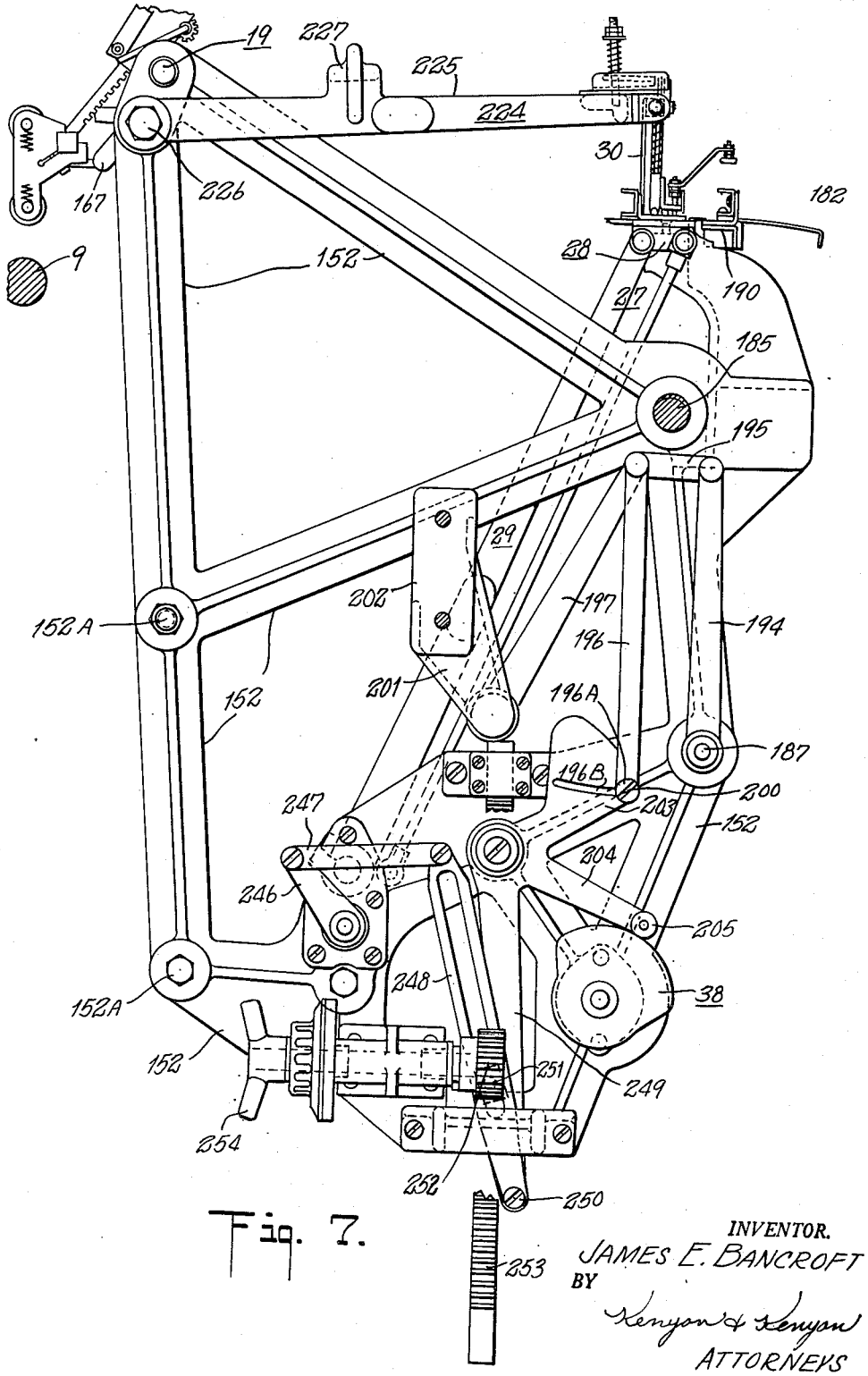
Figure 10:
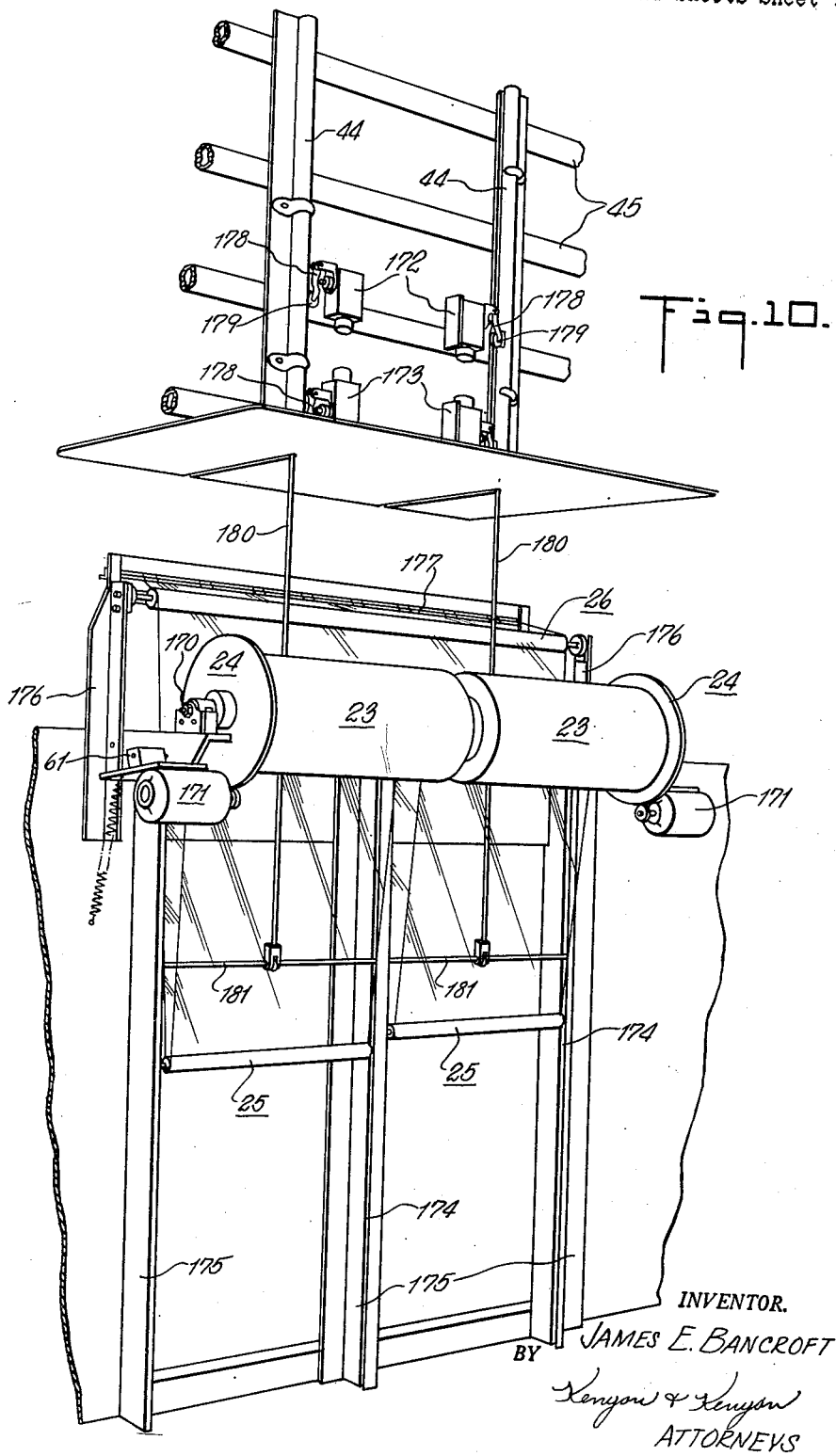
Figure 13:
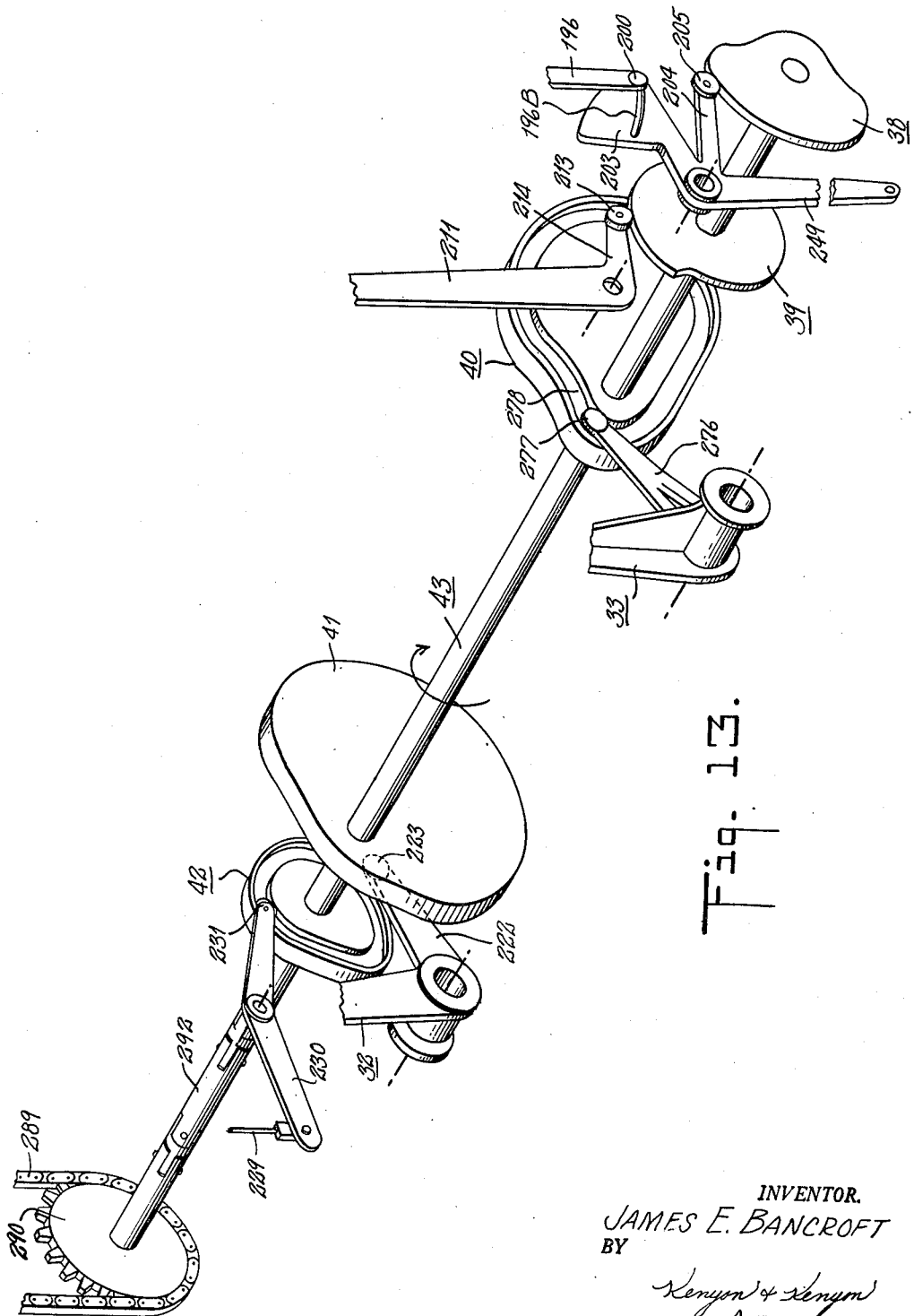

Somewhat like the Fig. 6, the Fig. 7 is a right side view of the paper control mechanisms seen in part in the Fig. 6, Fig. 7 showing the same in somewhat greater detail;

Fig. 8 shows a detail of the wire tensioning devices which may be seen in general view on the upright rack structure of Fig. 1 and positioned on the rear of the table-like structure;

Fig. 9 illustrates a wire supply spool to be positioned on the spindle of the Fig. 8, a plurality of such spools being seen each on a plurality of such spindles on the upright rack of the Fig. 1;

Fig. 10 represents a partial rear view of the machine of Fig. 1 (the rear view being concealed in Fig. 1) and showing the major portion of the mechanism which supplies or feeds paper to the hereinafter described mechanisms for premeasuring and inserting the paper into the finished coils;

Various of the Figs. 11 through 35 illustrate certain details of the already mentioned mechanisms or constitute explanatory and control circuit diagrams, explanations of all of which may be postponed to the appropriate points in the description below, although it may be noted here that the Figs. 14, 15 and 16 each illustrate one of three progressively assumed positions of the premeasuring and insertion mechanisms, the paper being grasped for premeasuring and insertion in a first rest position shown in the Fig. 14, being drawn forward to a second rest position of the Fig. 15 at which it has been premeasuring and is about to be cut off, and then being drawn further to the third instantaneous reversal position of Fig. 16 at which the cut off strip of paper has been advanced to accomplish insertion into the coil. The Fig. 13 illustrates a five-cam member for controlling that action just described; while the Fig. 27 illustrates that action graphically. The remaining of the figures show mechanical details and an electrical control circuit cooperating with the mechanisms of those figures just described.

GENERAL ARRANGEMENT AND FUNCTIONING

For clarity of exposition, the machine is considered as composed of three general cooperating assemblies as follows: the wire tensioning mechanisms for maintaining suitable tension in the wire prior to winding; the traverse mechanisms for guiding wire to a coil being wound; and paper control mechanisms for delivering paper to the same.

Wire tensioning mechanisms

The wire tensioning mechanisms 1 (see Fig. 1) comprise the generally upright rack structure extending upward at the rear of the fixed supporting base or frame comprising the generally table-like structure 2. These control the feeding, under a suitable degree of automatically adjusted tension of wire from each of a plurality of replaceable supply spools 3 over that one of the plurality of pairs of pulleys 4 and 5 associated with the particular spool to the guide rollers 6 of traverse mechanism 7 for delivery to a coil being wound. Each pulley 4 is positioned on and near the proximal end of a rod 8 journaled at its proximal end in the upright rack structure so that it may rotate to permit vertical reciprocation of its distal end, upon which pulley 5 is positioned, in accordance with increases or decreases of the tension in the wire delivered from spools 2 to guide rollers 6.

The traverse mechanisms

Figure 2:
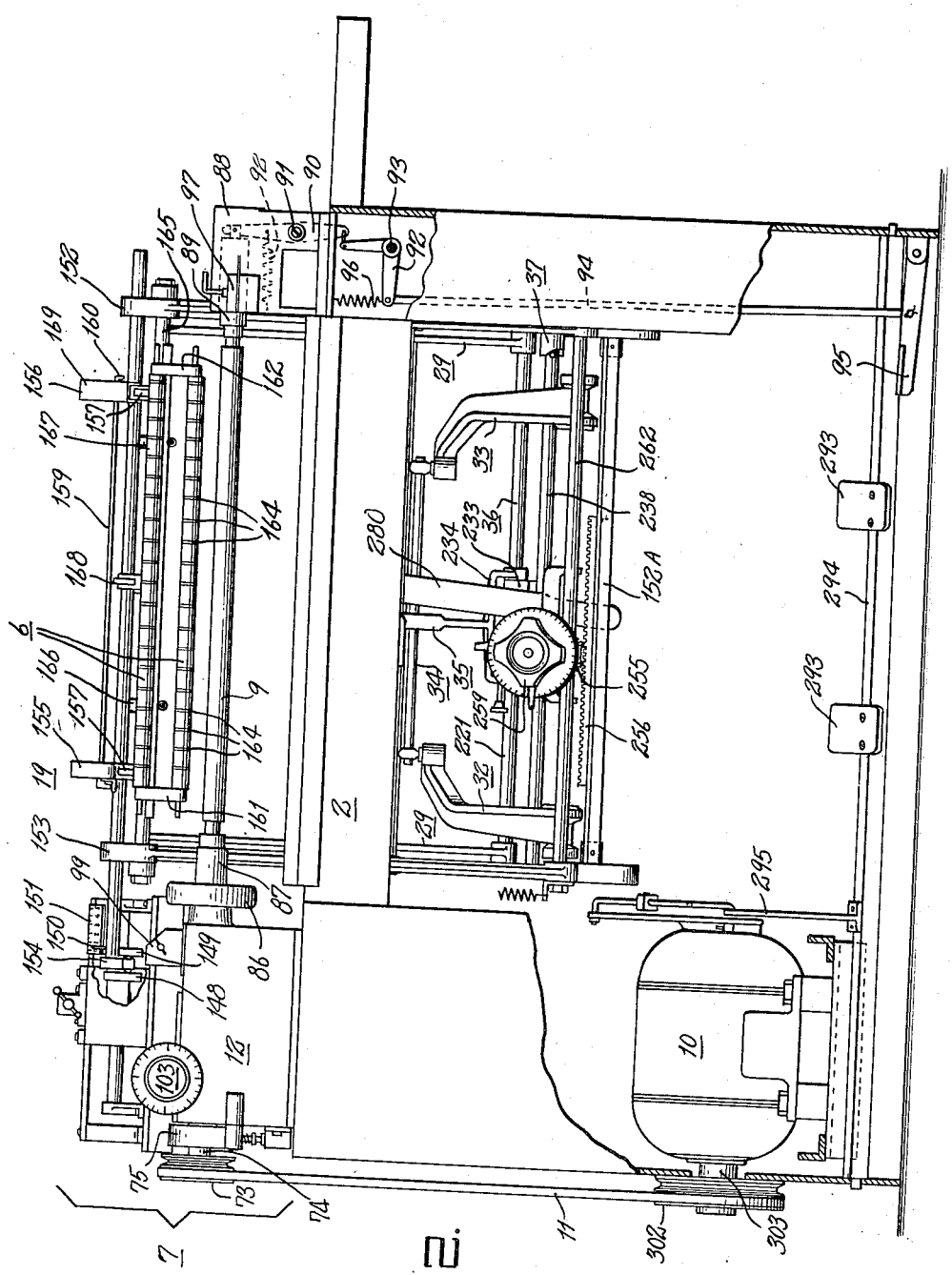
Fig. 2 is a partial, fragmentary front view of the machine of Fig. 1, the front thereof being the side viewed as from the left of the drawing of Fig. 1.
Figure 3:
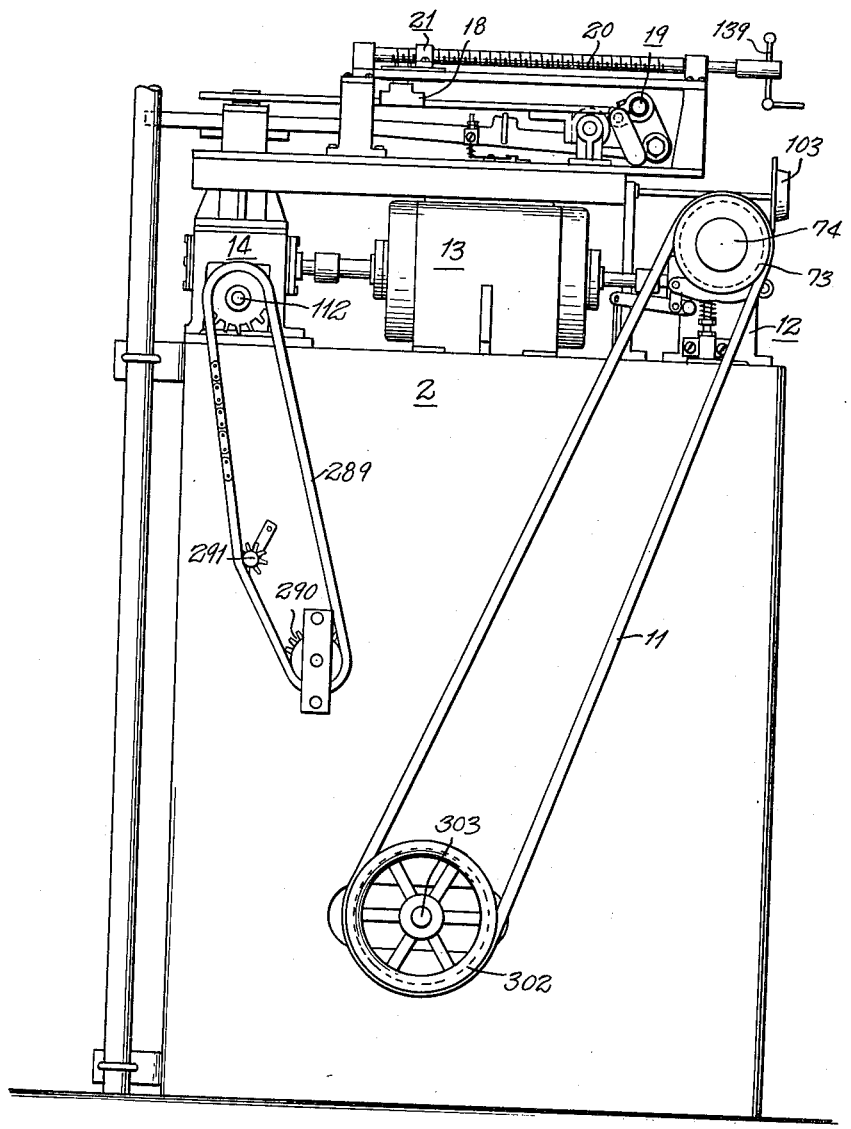
Fig. 3 is a partial left side plan view of the machine of Fig. 1, that side being concealed from view in the Fig. 1.
Figure 4:
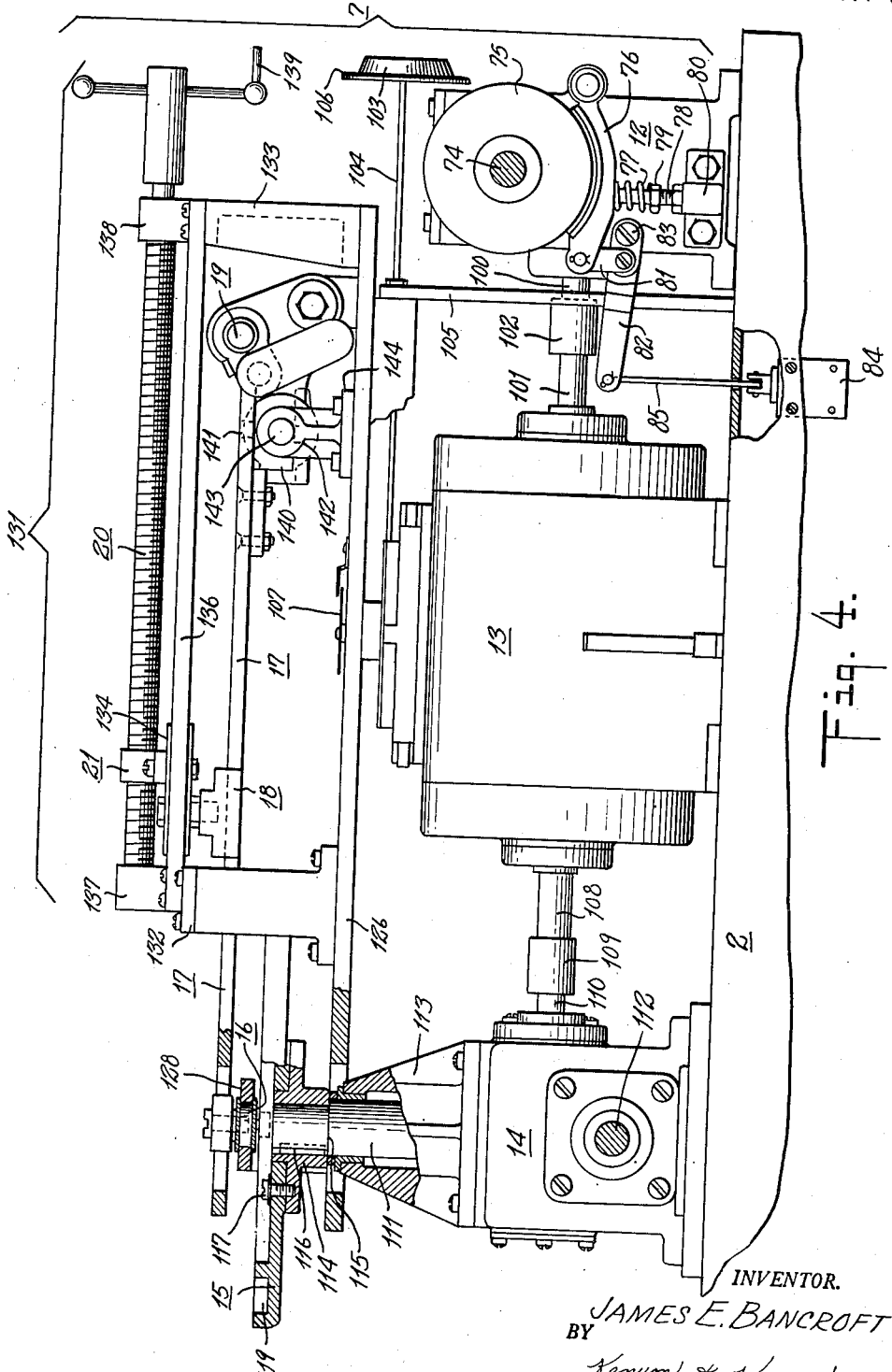
Fig. 4 is a partial view of the left side of the machine showing certain details of the traverse mechanisms and may be considered to be a more detailed view of the upper part of the Fig. 3.

The traverse mechanisms 7 comprise for the most part the machinery shown on the front and left of the table-like structure 2 and their manner of operation is best visualized from their various views in the Figs. 1 through 5. They comprise essentially as the ultimate wire handling structure of their train of elements the reciprocable guide rollers 6 (Figs. 1 and 2) for receiving the wire strands directly from pulleys 5 and guiding each of them in reciprocatory motion from end to end of each of one or more corresponding coil forms rotated on an arbor or arbors 9 (Fig. 2; only the supports shown in Fig. 1) during the coil winding operation (alternative structures for the arbor or arbors 9 and the guide rollers 6 are contemplated and illustrated in the Figs. 1 and 2 as will be explained hereinafter). In order to cause reciprocation of guide rollers 6 and to permit control of the extent and speed of reciprocation to accommodate different lengths of coil forms on the arbor or arbors 9 and different diameters of wire wound thereon, the following train of elements may be provided. Power may be delivered from a motor 10 (Figs. 1 and 2) through a belt drive 11 (Figs. 2 and 3), gear box assembly 12, variable ratio transmission 13, and gear box assembly 14 (Figs. 3 and 4), to rotate cam 15 (Figs. 4 and 5) which causes reciprocation of carriage 16 and thereby the end of a lever 17 linked thereto. Lever 17 is pivoted at an adjustable pivot comprising the slide 18 (Figs. 3 and 4). The consequent reciprocation of the other end of lever 17 causes, through mechanical inter-connections to be described, reciprocation of the rod 19 (Figs. 1 to 5) and the guide rollers 6 adjustably mounted on rod 19, as will be described. Simultaneously with the reciprocation, arbor or arbors 9 are powered for rotation through gear box 12.

By adjustment of the pivot point of the lever 17 by variation of the position of the slide 18 with the threaded rod 20 and threaded rider 21 movable longitudinally of threaded rod 20 and affixed to slide 18 (Figs. 3, 4 and 5), the extent of reciprocation of the guide rollers 6 may be adjusted to accommodate different lengths of coil forms on the arbor or arbors 9. By adjustment of the position of rollers 6 as hereinafter explained, coils of different diameters may be accommodated. By varying the speed of reciprocation relative to the speed of rotation of arbor 9, by means of the variable ratio transmission 13, the system may be adjusted to accommodate different diameters of wire wound on the coil forms.

Paper control mechanisms

The paper control mechanisms comprising the means for supplying, advancing, premeasuring, and inserting the insulating paper or like material between the layers of wound wire, sheet or other material on the finished coil, are designated generally by the numeral 22 and are, for the most part, the mechanisms positioned below and extending upwardly through the open center of the table-like structure 2 of Fig. 1, and the mechanisms shown in Fig. 10 as positioned on the rear of the machine. They may, however, be better visualized by reference to all of the Figs. 1, 2, 6, 7 and 10 and certain of the more detailed drawings as hereinafter indicated.

The mechanisms generally referred to as the paper supply mechanisms for supplying paper to the mechanisms generally referred to as the premeasuring and insertion mechanisms may best be visualized by reference to Fig. 10 constituting a view of the structure on the rear side of the machine of Fig. 1. Two supply rolls of paper 23 are shown as stored on reels 24, the paper extending downward, around rollers 25 and upward over roller 26 from which it is advanced by means hereinafter detailed for delivery to the paper premeasuring and insertion mechanisms.

The ultimate paper handling member in the train of elements comprising the latter two mechanisms may be considered to be the rotary reciprocable U-shaped paper premeasuring and insertion member 27 having a generally horizontal paper grasping shelf-like arm 28 and rotary side arms 29 which rotate about their lower ends to accommodate the reciprocatory rotary movement of the member 27. Member 27 is probably best seen in the Fig. 7 but also in part in such figures as Nos. 1, 2, 6, 11, and 14 through 16. It is adapted to stop in two rest positions (shown respectively in the Figs. 14 and 15) and in a position of instantaneous reversal (shown in Fig. 16) in the course of a progressive but discontinuous or step-like motion constituting the forward movement of its reciprocatory cycle. In the position shown in the Fig. 7 (or Fig. 14), arm 28 grasps the paper 23 and thereafter moves forward and stops at the position shown in the Fig. 15. In this movement it premeasures a strip of paper of length sufficient to cover the momentary circumference of the coil being wound, and while the member 27 is in the position of Fig. 15 the paper is cut off by the knife 30. Thereafter the member 27 moves on forward to the position shown in the Fig. 16, thereby inserting the premeasured and cut piece of paper between the layers of wound wire, sheet or other material of the coil being wound on arbor or arbors 9. Upon completion of the insertion, member 27 returns to the position of Fig. 14 to repeat the premeasuring and insertion action in timed relation to the addition of the next layer of wound wire, sheet or other material.

In order that the successive premeasured strips of paper may be progressively increased in length to accommodate the increasing diameter of the coil as it is wound, mechanisms are provided to increase the traverse of the member 27 as it moves from the position of Fig. 14 to that of Fig. 15, i. e., as the diameter of the coil progressively increases the intermediate rest position (Fig. 15) of the member 27 progressively moves toward the front of the machine. This action is the result of the mechanisms for reciprocating the member 27 which mechanisms are best visualized from the Fig. 2 and the Fig. 21. From these figures it will be seen that the member 27 is driven in its reciprocatory motion through the cross-bar 31 between its side arms 29 by a linkage comprising the following: Two cam driven arms, 32 and 33, rotatable independently of each other by cam action (cf. Fig. 13) and hereinafter called respectively the paper measuring operator arm 32 and the paper insertion operator arm 33, are interconnected by a cross-bar 34 which is arranged to pivot about arm 35 and to reciprocate the same arm 35 forward and rearward of the machine when either of arms 32 and 33 is reciprocated. arm 35 is slidably affixed to the cross-bar 31 of the member 27, cross-bar 34, and axle 36 of member 27 so that it may be positioned at various positions longitudinally of all three. The points along the length of cross-bar 34 at which the arm 35 establishes a pivot for the cross-bar 34 is progressively moved toward the left as the wound coil increases in diameter, this being accomplished by progressively moving the arm 35 to the left by means of the periodically operable cylindrical end cam 37 which moves arm 35 periodically in a manner hereinafter described.

The premeasuring motion of the member 27 (from the position of Fig. 14 to that of Fig. 15) is accomplished by rotation of the paper measuring operator arm 32 toward the front of the machine of Fig. 1. During this motion of the arm 32, the arm 33 remains fixed (except for the motion indicated in the following paragraph) and, therefore, the cross-bar 34 is pivoted about its inter-connection with the arm 33. The rotary motion of the cross-bar 34 rotates arm 35 about axle 36 thereby moving the cross-bar 31 and the whole of member 27 forward by a distance (position Fig. 14 to position Fig. 15) determined by the position of the pivot point established by arm 35 longitudinally of cross-bar 34. Thereafter, for the major portion of the insertion movement, the paper insertion operator arm 33 is likewise rotated forward similarly rotating cross-bar 34 about the then fixed arm 32 and thereby similarly moving arm 35, cross-bar 31 and the whole of member 27 forward by an additional amount (position Fig. 15 to position Fig. 16). For the final portion of the insertion movement, both arms 32 and 33 undergo a final quick forward motion (later detailed) to accomplish a quick insertion of the paper into the coil. It will be apparent that as the pivot point established by the arm 35 moves progressively toward the left the amount of premeasuring motion of the member 27 caused by the motion of the paper premeasuring operator arm 32 will progressively increase; while the motion of the paper insertion operator arm 33 will always complete the traverse of the member 27 to accomplish insertion regardless of how much paper has been premeasured.

A refinement of the motions just described, also governed by the cam actions later to be described, should be noted at this point. It is desirable that member 27 be capable, in the position of Fig. 15, of premeasuring a strip of paper approaching a very minimum length when arm 35 is near its extreme right-hand position. Therefore, it is desirable that in the extreme right-hand position of arm 35 there be zero or substantially zero premeasuring motion of member 27. However, since arm 35 is held slightly away from the very tip or pivot end of cross arm 34 by the finite size of the mechanical attachments and bearings, there would normally be a slight premeasuring motion even when arm 35 is in the extreme right-hand position. To eliminate this, the arm 33 is caused to rotate slightly rearward as the arm 32 begins to go forward from the Fig. 14 position, but this rearward motion of arm 33 is only enough to insure that the pivot point between arms 34 and 35 will remain stationary when arm 35 is in the extreme right-hand position even though arm 32 goes forward, i. e., arm 35 will not move forward nor will member 27.

All of the paper control functions just described may be accomplished in properly timed relation by cam means such as that shown best in the Fig. 13. The cams 38, 39, 40, 41 and 42, all of which are affixed to and rotate with the shaft 43, each control respectively: the periodic advancing of the supply of paper from the paper supply mechanisms to the arm 28 as well as the periodic leftward advancement of arm 35 to advance the pivot point between arm 35 and cross-bar 34 for progressively increased premeasurement, this latter advancement of arm 35 also being associated with a later detailed progressive raising of guide rollers 6 as the coil diameter increases, and a progressive lengthening of the length of paper projecting through and ahead of arm 28 as it is advanced into arm 28 from the paper supply mechanisms (all for cam 38); the gripping of the paper by the member 27 (cam 39); the movement of paper insertion operator arm 33 (cam 40); the movement of paper premeasuring operator arm 32 (cam 41); and the cutting of the paper by knife 30 (cam 42). The details of the mechanisms inter-connecting these cams with their controlled members will be explained later.

The foregoing is intended to afford an overall picture of the arrangement, principles and functioning of the inventive embodiment described herein. In order better to enable those skilled in the art to make use of the invention, the further details of the various mechanical arrangements will now be described.

WIRE TENSIONING MECHANISMS

As shown in the Fig. 1 the wire tensioning assembly 1 may be supported by any suitable means such as the upright rack projecting from the table-like structure 2 and comprising the series of vertical pipes 44 affixed to the structure 2 and supporting a plurality of horizontal pipes 45 by means of the collars 46 at the intersections thereof. Diagonal supporting pipes 47 may also be provided.

Disposed on the horizontal pipes 45 are a plurality of wire tensioning mechanisms each adapted to receive a replaceable supply reel 3 of wire and control the passage of the wire thereof over the pulleys 4 and 5 of the associated tensioning mechanism to the traverse mechanisms. It will be understood that the machine is adapted to wind a plurality of coils simultaneously on the arbor or arbors 9 for which reason a plurality of supply reels 3 and associated tensioning mechanisms have been illustrated. Each reel and tensioning mechanism operates independently of the others, however. Each tensioning mechanism may be considered as consisting of an upper portion 48 affixed to the uppermost horizontal pipe 45 and a lower portion 49 disposed directly beneath the upper portion and affixed to one of the lower horizontal pipes 45. The details of the lower portion are better illustrated by the Fig. 8.

The upper portion of each tensioning mechanism comprises a rod 8, the distal end of which is reciprocable vertically up and down approximately over the guide rollers 6 by virtue of the fact that the proximal end is rotatably mounted in suitable fixed means as by being provided with an end block 50 journaled in clamp 51 affixed to upper pipe 45. Each rod 8 is upwardly biased by some upper limiting position as by the spring 52A and has affixed thereto the rotatable pulleys 4 and 5 already referred to. Rotatably affixed to the block 50 at a short distance beyond its pivot point is connecting rod 52 adapted thereby to reciprocate vertically in conformance with the reciprocation of the distal end of the rod 8. This connecting rod extends to lower portion 49 and is arranged to control the tensioning of the wire by braking action on brake drum 53 on the spindle 54 in a manner which is better illustrated by the Fig. 8.

Referring now to the Fig. 8 and the Fig. 9, it will be seen that the mechanism comprises generally a spindle 54 adapted to receive the reel 3 (Fig. 9) which is retained on the spindle by means of the slide catch 55 which, under the pressure of spring 56 exerted on end projection 57 through reel 3, normally tends firmly to grip the spindle, thereby securing reel 3 firmly thereon. Affixed to the spindle is the brake drum 53 including the pin 58 which engages a suitable hole 59 in the spool 3 in order that the assembly of spindle, reel, brake drum, and spring may be secured against relative rotation of these parts. The spindle including the brake drum 53 and the rest of the latter assembly is journaled for rotation in suitable fixed means as the split casting 60 affixed to the appropriate pipe 45. A suitable L-shaped lever 61 is likewise suitably journaled as by means of the shaft 62 in the casting 60, the shaft 62 extending completely through the casting in order to receive the crank arm 63 to which is affixed the tension spring 64 to bias the shaft 62 in a direction to raise the lower arm of the lever 61. The spring 64 is, of course, affixed at its other end to the casting 60, as at spur 60A, and to arm 63 by suitable means such as the threaded rod and nut 65 on arm 63. The crank arm 66 of lever 61 is adjustably secured to the connecting rod 52 by means of the adjustable pierced thumbscrew 67. Connecting rod 52 is adjustably connected to the thumbscrew by the nut 68. Pinned to the other crank arm 69 of lever 61 by pin 70 is a flat band 71 which passes around the periphery of the brake drum and is affixed to the casting 60 by pin 72.

From the foregoing it will be apparent that normally the spring 64 will cause a biasing force to be exerted on the band 71 to furnish a braking force for the spindle 54 and its associated reel 3. If, however, the rod 8 be drawn downward in response to the pulling of the coil winding action on the arbor 9, the connecting rod 52 will be drawn upwardly by virtue of the lever action of the block 50 thereby rotating the L-shaped lever 61 against the biasing force of the spring 64 and thereby releasing the brake action of the band 71. The reel 3 will, therefore, be more free to rotate and will, therefore, supply an additional amount of wire to the pulleys 4 and 5 thereby permitting the arm 8 to move upwardly again until tension is reestablished by the converse action of the connecting rod 52. It will be understood, therefore, that the system may be adjusted automatically to maintain the proper degree of tension at all times.

TRAVERSE ASSEMBLY MECHANISMS

Structure

As shown in Figs. 2, 3 and 4, double pulley 73 is affixed to and drives shaft 74 which is rotatably mounted in gear box assembly 12. Brake drum 75 is affixed to shaft 74 for rotation therewith. Pivotally attached to gear box assembly 12 is brake shoe 76 biased against brake drum 75 by spring 77 which is adjustably mounted on threaded rod 78 by nut 79. Threaded rod 78 is mounted in a tapped hole in bracket 80 affixed to the side of gear box assembly 12. Pivotally attached to brake shoe 76 by link 81 is arm 82 which is pivotally attached to gear box assembly 12 by shoulder screw 83, the other end of arm 82 being connected to the movable core of solenoid 84 by link 85. Solenoid 84 is bolted to the side plate of table-like structure 2.

Figure 5:
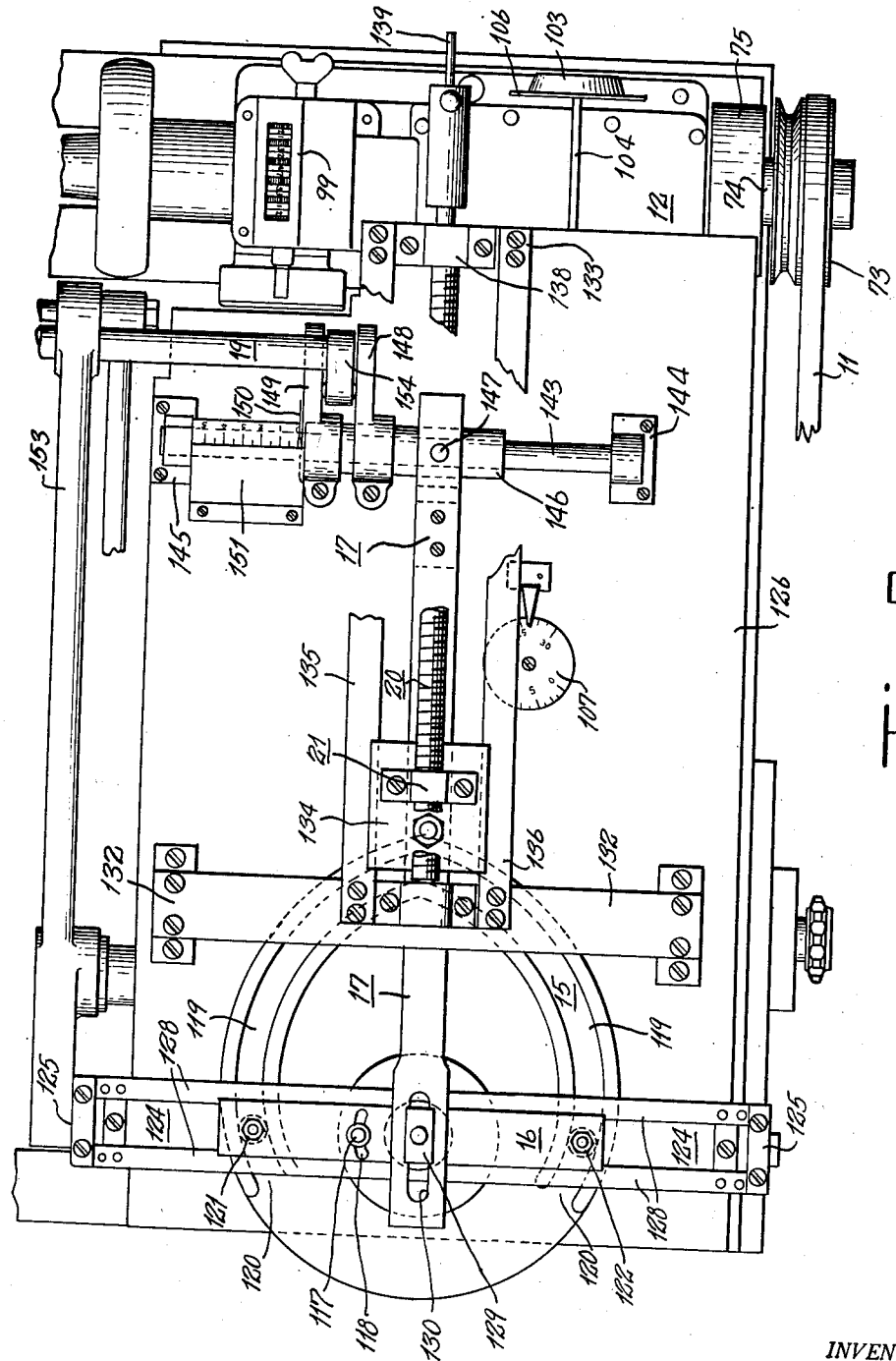
Fig. 5 is a partial fragmentary top view of the machine of the Fig. 1 and constitutes a detailed view of certain parts of the traverse mechanisms.

As seen from Figs. 2 and 5, shaft 74 runs through gear box assembly 12 and affixed to the right end of shaft 74 for rotation therewith, is hand wheel 86 and socket 87 adapted to receive and rotate slotted arbor 9. The other end of arbor 9 is rotatably mounted in tail stock assembly 88 which is affixed to the right side of table-like structure 2. Tail stock assembly 88 is provided with a retractable spindle 89 which holds the end of the arbor 9. Spindle 89 may be extended and retracted by the lever 90 pivoted at 91 and biased by spring 92 normally to force spindle 89 into engagement with arbor 9. Lever 90 may be pedally operated by the linkage comprising the lever 92 journaled at 93, the tie rod 94, and pedal 95, spring 96 normally biasing the linkage to raise the pedal 95. Spindle 89 may be locked in position by clamp lock 97.

As shown in Fig. 1, center support assembly 98 may be affixed to the forward edge of table-like structure 2 to support the inside ends of two short arbors (not shown), which may replace the one continuous arbor 9 when desirable. The short arbors are adapted to be engaged end to end so as to rotate together.

Shaft 74 in gear box assembly 12 may be geared to and drive rotation counter 99 (Fig. 5), in a 1:1 ratio drive.

As indicated by Fig. 4, shaft 74 may, through suitable gearing in gear box assembly 12, drive shaft 100 in a 2:1 reduction drive. Shaft 100 is connected to shaft 101 by flexible coupling 102. Shaft 101 drives the input of variable ratio transmission 13. For varying the speed of the traverse and paper control mechanisms relative to speed of rotation of arbor 9 during coil winding operation in order to accommodate different wire diameters, transmission 13 may be controlled by means such as manually operable wheel 103 and shaft 104 journaled in vertical support 105 (Figs. 1–4). Transmission 13 may be provided with two suitable ratio indicating dials 106 and 107. The output of transmission 13 drives shaft 108, flexible coupling 109, and shaft 110 of gear box assembly 14. Shaft 110 may drive shaft 111 (to the traverse mechanisms) by means of a worm gear (not shown) in assembly 14 at a 6:1 reduction ratio, and shaft 112 (to the paper control mechanisms) by means of another worm gear (not shown) at a 3:1 reduction ratio. Shaft 111 is rotatably mounted in head casting 113. Hub casting 114 is mounted against shoulder 115 of shaft 111 and is keyed to rotate with shaft 111 by means of key 116. Cam 15 is adjustably mounted on hub casting 114 for rotation therewith by means of a plurality of screws 117 passing through slots 118 (Fig. 5) in the case of the cam 15.

As best indicated by Fig. 5 but also by Fig. 4, cam 15 is provided on its upper surface with symmetrical peripheral grooves 119 continuous about that major portion of the periphery indicated by Fig. 5, i. e., for the most part, the portions farthest from the center of rotation of the cam, or the portions to the right of ends 120. The remaining minor portion of cam 15 (to the left of ends 120) is free of grooves. The open ends 120 of grooves 119 are so positioned that as one of cam rollers 121 and 122 enters the grooves during the rotation of the cam the other will leave them shortly thereafter as hereinafter more fully explained. Both of the grooves 119 follow Archimedean spirals so that the speed of reciprocation of carriage 16 is linearly related to the speed of rotation of the cam. That is to say the two halves of the curve of the groove from one end 120 to the other follow identical portions of Archimedean spirals which are mirror images of each other about the line of the radius through their apex at the right.

As shown in Figs. 4 and 5, slide assembly 124 is mounted on vertical studs 125 affixed to plate 126. Slide assembly 124 comprises cam follower slide or carriage 16 which rides between the two rails 128.

As shown in Fig. 5, rotatably mounted on the ends of cam follower slide or carriage 16 are cam rollers 121 and 122 adapted alternately to ride in grooves in the manner hereinafter explained. Rotatably mounted on the center of carriage 16 is slide 129 which travels in slot 130 of operating lever 17.

As shown in Figs. 4 and 5, fulcrum assembly 131 is mounted on bracket assemblies 132 and 133 which are affixed to plate 126. Fulcrum assembly 131 comprises slide 134 slidably mounted on rails 135 and 136. Affixed to slide 134 is threaded rider 21 mounted to ride on threaded rod 20 which is rotatably mounted in pillow blocks 137 and 138. Threaded rod 20 may be rotated by manually operable crank handle 139 in order adjustably to position rider 21 and slides 134 and 18 longitudinally of assembly 131. Rotatably affixed to the underside of slide 134 is slide 18 which rides along and serves as an adjustable fulcrum for operating lever 17. The right end of operating lever 17 ends in a forked section 140 (Fig. 4), affixed thereto. The right ends of operating lever 17 and forked section 140 are drilled to provide holes 141 and 142.

As shown in Fig. 5, rod 143 is mounted in pillow blocks 144 and 145 which are affixed to plate 126. Slidably mounted on rod 143 is reciprocating sleeve 146. Reciprocating sleeve 146 is provided with an upper and a lower stud 147. Studs 147 are rotatably mounted in holes 141 and 142 of the operating lever 17 and forked section 140. Affixed to sleeve 146 are ear assemblies 149 and 148. Indicator arrow 150 is affixed to ear 149. Mounted beneath indicator arrow 150 is indicator plate 151, one edge of which is affixed to plate 126, and the other edge of which is located directly below arrow 150 and is graduated in half scale to read in inches.

As shown in Figs. 2 and 5, traverse rod 19 is slidably mounted in paper feed frame castings 152 and 153 (described below under heading Paper Premeasuring Mechanisms). Affixed to the left end of traverse rod 19 is dog 154 (Figs. 2 and 5) slidably mounted for vertical motion between ear assemblies 148 and 149. Dog 154 transmits the horizontal reciprocatory motion of sleeve 146 and ears 148 and 149 to rod 19.

Affixed to traverse rod 19 are elevator assemblies 155 and 156 (Fig. 2). Each elevator assembly comprises a rack 157 and a pinion gear 158 (Fig. 6). Rod 159 (Fig. 2) is rotatably journaled between elevator assemblies 155 and 156 and is provided with a crank 160. The pinion gears are affixed to rod 159 for rotation therewith. Affixed to the ends of racks 157 is the wire guide assembly including guide rollers 6. The wire guide assemblies comprise two triangular end pieces 161 and 162 (Fig. 2) supported on and joined by bar 163 (Fig. 6). Bar 163 is affixed to the ends of racks 157 and is movable therewith. Rotatably supported in end pieces 161 and 162 are upper and lower wire guide rollers 6, each roller being provided with a plurality of grooves 164. Affixed to horizontal tie rod 165 (Fig. 2) are limit stops 166 and 167 which slidably support the wire guide assembly and limit its downward motion.

As shown in Figs. 2 and 6, linked to the center of traverse rod 19 is a radius arm assembly 168 which is pivotally attached to bar 163 so as to be movable in a vertical plane. Elevator assembly 156 is provided with a locking pawl 169 pivotally attached thereto.

*Functioning of traverse assembly mechanisms*

From the foregoing it will be apparent that when the train of mechanisms just described is supplied with power from motor 10 through gear box assembly 12, transmission 13, and gear box assembly 14, carriage 16 will be reciprocated by cam 15 by means of cam rollers 121 and 122; operating lever 17 will be reciprocated about slide 18 as a fulcrum; and traverse rod 19 will be reciprocated by the opposite end of operating lever 17 through engagement of dog 154 by ear assemblies 148 and 149 with sleeve 146 as an intermediate member. Consequently wire guide rollers 6 will be reciprocated to guide wire back and forth along the length of coil form on arbor 9.

The action of cam 15 and its cooperating cam rollers 121 and 122 is particularly to be noted. As cam 15 rotates it will engage one cam roller within grooves 119 and shortly thereafter release the other. This follows because the distance between the groove intercepts points of any diametric line through the cam axis and each of the grooves will be a constant equal to the distance between rollers 121 and 122. Rotation of the cam through 180° from the Fig. 5 position will cause completion of one half of the reciprocatory cycle of slide carriage 16 by means of the cam roller which remains engaged. Slightly before completion of this 180° rotation, the grooves will engage the other cam roller, and slightly after the completion of the 180° rotation release that roller first engaged. Further rotation through 180° will cause completion of the second one half of the reciprocatory cycle of the carriage by means of the other roller. The reciprocation will take place repeatedly in this manner, the slide carriage 16 therefore reciprocating through a distance equal to twice the difference between the shortest and longest radius of grooves 119 for each 360° rotation of the cam. The arrangement has the particular merit that the change in direction as the cam rollers pass the apex of the grooves 119 will occur more smoothly than with conventional heart-shaped cam arrangements in which a roller must also move around another apex which would be positioned in the region between ends 120 at a lesser distance from the axis than the apex already mentioned.

Adjustment of the extent of horizontal traverse of rod 19 and guide rollers 6 to accommodate coil forms of different lengths may be accomplished by varying the fulcrum position of operating lever 17 by adjusting the position of slide 134 and slide 18 with crank handle 139. As already suggested, adjustment of the speed of traverse relative to the speed of rotation of the arbor to accommodate different diameters of wire may be accomplished by varying the ratio of the output of transmission 13 with respect to its input by adjustment with wheel 103.

Guide rollers 6 may be raised or lowered manually by manipulation of crank 160 thereby raising or lowering racks 157 with pinion gears 158. Guide rollers 6 are automatically raised during coil winding to accommodate the increase in diameter as the coil is wound. However, since the mechanisms for performing this action are closely associated with the paper control mechanisms hereinafter discussed, consideration of them will be held in abeyance until the paper control mechanisms are explained.

PAPER CONTROL MECHANISMS

For convenience of description, the various mechanisms for controlling the timed delivery of paper to the coils being wound may be considered as comprising: first, the paper supply mechanisms which periodically unroll quantities of a continuous strip of paper and advance it to the paper premeasuring and insertion mechanisms; secondly, the paper premeasuring mechanisms which measure out and sever from the continuous strip thus supplied progressively increasing lengths thereof; and, thirdly, the paper insertion mechanisms which insert the severed premeasured lengths of strip into the coil as it is being wound.

It will be understood that the use of the term "paper" in referring to all of these mechanisms is for convenience of description only and therefore that its meaning embraces broadly any sheet-like material which will serve the purpose of insulation between the various layers of wound wire, sheet or other material in the wound coil and which may be handled with equal facility by the various control mechanisms to be described.

Paper supply mechanisms

As best seen in the Fig. 10, the reels 24 containing the supply roll of paper 23 are rotatably mounted in suitable journals 170 affixed to the machine proper; rotation occurs, however, only when the reels are driven to unroll paper strip by the motors 171 which are energized and de-energized in timed relation under the control of the switches 172 and 173, as hereinafter more fully explained. Rollers 25 over which paper 23 passes are mounted to ride in a horizontal position freely in the channels 174 in the fixed frames 175, and are adapted to be moved upward in response to tension created in the surrounding paper loop upon withdrawal of the paper over the roller 26, or downward by gravity or otherwise when the paper tension is released. Roller 26 is journaled in the fixed angle-iron frame 176 for free rotation under the tension of the paper as it is drawn by the paper measuring mechanisms, later explained, through the device 177 which prevents reverse movement. Device 177 may comprise any conventional means for the purpose, such as a resilient blade of rubber or other material mounted as the upper member of a suitable slit-like frame and which protrudes at an angle in the direction of the moving paper. It will be understood that such material will be forced against the paper if there is a slight amount of reversed movement and thereby it will lock it against the lower member of the frame. Resumed forward motion will, of course, release the lock and will always permit free forward movement.

The switches 172 and 173 may be suitably mounted on the fixed upright rack structure supporting the wire tensioning mechanisms and have operating arms 178 each provided with suitable rollers 179 which may protrude through suitable holes in the upright pipes 44. Riding within each of the pipes 44 is a vertical rod 180 each provided with a suitable piston structure (not shown) within the associated pipe 44 for operating the switch arms as hereinafter more fully explained. Normally the rods 180 are biased downwardly either by gravity or by other suitable means to the position approximately as shown. These are connected to cross-rods 181 which may ride freely in the channels 174 of the frames 175. The junctures of the rods 180 and the cross-rods 181 are provided with suitable roller mechanisms which will permit free rolling engagement with the rollers 25 as the latter are raised under tension of the paper, in turn raising the rods 180 to actuate the switches 172 and 173. It is to be understood that the two rolls of paper may be replaced by a single roll by removing the middle frame of frames 175, and connecting cross-rods 181 and replacing rollers 25 with a single roller.

The functions of the foregoing paper supply mechanisms are as follows: Upon withdrawal of paper through the device 177 by the paper advancing supply arm and premeasuring mechanisms, presently to be described, the rollers 25 will rise under the tension of the paper and in turn raise the cross-rods 181 until a predetermined position is reached at which the pistons within the pipes 44 will be in a position to actuate the switches 172 and thereby energize the motors 171 with subsequent unrolling of the paper. As the paper is unrolled, the rollers 25 together with the cross-rods 181 will move downward taking up the slack in the loop of paper surrounding the rollers 25, until a predetermined lower position is reached at which the pistons within the pipes 44 will actuate the switches 173 to deenergize the motors 171. Suitable electrical control circuits for accomplishing this action are explained later in connection with the Fig. 35.

As it leaves the device 177, the paper moves immediately to the ramp 182 (Figs. 6, 7, 12, 14 to 16 and 33) from which it is moved onward toward the front of the machine by the paper advancing supply arm and premeasuring mechanisms presently to be described. Ramp 182 extends horizontally from side to side of the machine coextensively with reels 24 and comprises spaced strips 183 with intervening open interstices 184 (Fig. 33).

*Paper advancing supply arm and paper premeasuring mechanisms*

Before proceeding, it should first be noted that most of the paper control mechanisms hereinafter described (together with the coil diameter compensating mechanisms also explained later) are mounted in and rotatable with the slightly rotatable frame structure comprising the rigid identical frameworks (sometimes called the paper feed or paper control frame castings) 152 and 153 (Figs. 1, 2, 6 and 7) and various interconnecting rods 152A and like elements forming a rigid framelike structure rotatable as a whole about the journals 185 and 186. The amount of rotation of this structure is only enough to permit manual or automatic positioning of the paper control mechanisms (including positioning of the rollers 6 of the traverse mechanisms which are mounted on the framelike structure) to accommodate coils of different initial or final diameters, or the progressively increasing diameter of coils in the process of winding.

As better seen in Figs. 7 and 11 although also in such figures as 6 and 14 through 16, there is associated with the ramp 182, a paper advancing supply arm comprising a rotatable U-shaped structure journaled in frame castings 152 and 153 at 187 by means of its side arms 188 and provided with the horizontal arms 189 and 190 extending respectively above and below ramp 182. Horizontal arm 189 may be provided at points along its length corresponding to interstices 184 (Fig. 33) with paper grasping jaw mechanisms comprising the studs 191 (Fig. 11) freely hinged at the pivot 192 and provided on their lower ends with paper grasping members 193 of some relatively flexible substance such as rubber. Studs 191 and members 193 are so constructed that they will normally extend at an angle forward toward the front of the machine whereby upon forward motion of the paper advancing supply arm, they will engage the paper against the lower bar 199 thereof (through interstices 184) and thereby push it forward; and yet in the rearward motion, they will freely move over the paper without causing any rearward motion thereof.

The paper advancing supply arm is operated in timed relation to the other elements of the paper premeasuring and insertion mechanisms by the cam operated linkage comprising a lever arm 194 (Fig. 11) also journaled at 187 and arranged to rotate with arms 188, and the three arms 195, 196 and 197 freely rotatable with respect to each other and to the lever arm 194, at the journals 198, 199 and 200. The forward end of arm 197 is journaled in arm 201 affixed to block 202 which is affixed to the base of the machine e. g., the table-like structure 2. The latter linkage is operated by cam follower lever 203 journaled in casting 152 and rotatably connected to arm 196 at journal 200. Cam follower lever 203 is provided with the second arm 204 carrying the cam roller 205 which rides on the cam 38 (Figs. 12 and 13).

It will be apparent that as the cam roller 205 rides up on to the upper level of the cam 38, the linkage just mentioned will cause the paper advancing supply arm, including the jaw mechanisms, to rotate forward, pushing a quantity of paper onto the receiving jaw mechanism of the paper premeasuring and insertion member 27 presently to be described. As will be explained, the time related action of the cams operating both of these mechanisms is such that the member 27 will always be in the position shown in the Fig. 14 ready to receive paper whenever the paper advancing supply arm is moved forward by action of cam 38.

The length of paper projecting through the delivery shelf of member 27 increases automatically and progressively as the coil outside diameter increases. This is because the rearward extreme position of the paper advancing supply arm and arms 188 moves progressively rearward as frame castings 152 and 153 rotate upward about their journals 185 as later indicated. As the frame castings so rotate (clockwise in Figs. 7 and 11) from their initial positions corresponding to minimum coil diameter, the slope of arm 197 increases. As a result, the angular displacement of arm 197 increases for a constant angular displacement of arm 203. An increased angular displacement of arm 197 results in a longer paper projection through the delivery shelf slit because of a greater rearward traverse of arms 188. The length of the initial overhang of paper projecting through member 27 may be adjusted by moving bottom end of arm 196 to the right by means of clamp nut 196A which permits the bottom end or journal 200 of arm 196 to be fixed at any point along arcuate channel 196B cut through arm 203.

The aforesaid progressive increase of the overhang or length of paper projecting through the delivery shelf of member 27 is to compensate for the progressive increase in the distance between the extreme forward position of member 27 and the coil as the coil diameter increases— this being due to the rotation upwardly and rearwardly of frame castings 152 and 153. The manner of adjusting the cam operated linkage to obtain the desired quantitative values of paper overhang increase for the aforesaid purpose will be readily understood.

Paper premeasuring and insertion member 27 may rotate about its journals 206 (Figs. 7 and 11) affixed to the frame castings 152 and 153. Arm 28 is maintained in a horizontal position by the tie rods 207 similarly journaled in the frame castings 152 and 153 at 208 and journaled in arm 28 at 209. Horizontal arm 28 extends parallel to and coextensive with the paper ramp 182.

On arm 28 are provided jaw mechanisms 210 similar to those provided on the paper advancing supply arm (189 to 193). In order that the jaw mechanisms 210 may be opened when in the position of Fig. 14 to receive paper advanced by the paper advancing supply arm, there may be provided the mechanism detailed in Figs. 33 and 34. L-shaped lever 211 is journaled for free rotation at the journal 212 affixed to the casting 152 and provided with the cam roller 213 on its one arm 214, the cam roller riding on the cam 39. Toggle arm 215 is rotatably affixed at 216 to the structure of arm 28 and is biased in the counterclockwise direction by spring 217. It is so constructed that when rotated clockwise it will open the blade 218 of jaw mechanisms 210 thereby permitting the insertion of paper between arm 28 and blade 218. Clockwise rotation is accomplished as member 27 returns to the Fig. 14 position and stud 219 of toggle arm meets arm 211 which is then forward by virtue of the action of cam 39. That is to say, when the cam roller 213 is on the upper level of the cam 39, the upright arm of the lever 211 will operate to open the jaws 210; the jaws 210 closing when the cam roller 213 is on the lower level of cam 39.

The mechanisms for moving the paper premeasuring and insertion arm 27 forward after its jaw mechanisms 210 have grasped the paper at the position of Fig. 14 are, as stated earlier, better visualized by reference to Fig. 21 and the cam structure of the Fig. 13. Figs. 22, 23 and 24 are respectively cross-sections along the lines 22—22, 23—23, and 24—24 of Fig. 21. The cross-rod 31 between the side arms 29 of the paper premeasuring and insertion arm 27 is connected to the axle 220, upon which the premeasuring and insertion arm rotates, by the slidable link 35 already referred to. As likewise already indicated, pressure for forward or rearward movement may be exerted on the arm 35 by means of the cross-rod 34 operable serially by the paper measuring operator arm 32 and by the paper insertion operator arm 33. Both of the latter arms are journaled for free rotation on the shaft 221 affixed to the castings 152 and 153. The structure and journaling of arms 32 and 33 on 221 can also be seen in Figs. 17, 19 and 20, Fig. 19 being a cross-section along the line 19—19 of Fig. 17, and Fig. 20 a cross-section along the line 20—20 of Fig. 19. The left end of cross-bar 34 has a portion of reduced diameter slidably extending through arm 32 so that it may accommodate the different distances between the ends of arms 32 and 33; the right end is fixed to but rotatable in the end of arm 33.

Taking first the paper measuring operator arm 32, this, as better seen in the Figs. 13 and 19, is provided with the arm 222 having on its end a cam roller 223 cooperating with cam 41. When the cam roller 223 is on the lower level of the cam 41, the paper measuring operator arm 32 will be moved forward, exerting pressure on the paper premeasuring and insertion arm 27 structure to move the same to the position shown in the Fig. 15. As will be explained later, the paper insertion operator arm 33 will operate similarly, but later, to move it to the position of Fig. 16.

The advancement of the paper premeasuring and insertion arm 27 to the position of Fig. 15 will draw the paper forward to that position after which the arm comes to rest and awaits the cutting off of the advanced paper strip by the knife 30 through the following mechanisms:

As better seen in perspective in Fig. 1 but also in Figs. 6, 7, 11 and 14 to 16, the knife 30 is supported by the rotary U-shaped structure 224 having side arms 225 journaled for free rotation at the pivot point 226 affixed to the frame castings 152 and 153 and the intermediate arms 227 and 228 extending parallel to the end coextensive with the paper strip. The cutting arm structure 224 may be rotated downwardly to cut the paper at the proper time by a linkage comprising the tie rod 229 (better seen in the Figs. 12 and 13), the lever 230 having at its opposite end the cam roller 231 cooperating with cam 42. Lever 230, like the similar lever 204 working on cam 38 is journaled on a shoulder screw 232 mounted in frame castings 153 and 152. When the cam roller 231 is at the lower level of the cam 42 the paper cutting arm structure 224 will be up; but as that cam roller 231 moves to the upper level of the cam 42 the paper cutting arm structure 224 will be drawn downward by the lever action through tie rod 229 to shear the paper by means of knife 30.

At this point the paper strip will have been premeasured and will be read for insertion into the coil by means of the mechanisms soon to be described. However, before proceeding to the paper insertion mechanisms, the mechanisms for progressively increasing the length of the premeasured strip as the coil diameter increases will be noted.

As better seen in the Fig. 17 the arm 35 of Fig. 21 may be advanced to the left by a carriage 233 in steps of predetermined length determined by the increase in circumference of the coil being wound for each added layer of wound wire or other material. The mechanism is as follows. The structure comprising the carriage 233 is adapted to ride freely on the axles 220 and 221 between and in engagement with the arms of yoke 234 (affixed to arm 35) which arms encircle the axle 220 as shown in Fig. 22. Affixed to the carriage is the block 275 and cooperating therewith are the washers 236 and 237 riding and surrounding, respectively, the axles 221 and 238 (likewise journaled in frame castings 152 and 153). Each washer is adapted to position itself angularly with respect to the axles 221 and 238 by means of the springs 239 and 240, their distance from the block 275 being adjustable by lock nut-bolt arrangements 241 and 242. By virtue of this arrangement the washer 237 will firmly engage the axle 238 if the axle 238 be moved toward the left. Thus, any leftward movement of the axle 238 will carry the carriage 233 leftward with it, however, movement of the axle 238 to the right will result in disengagement of the washer from that axle and, therefore, it will move freely to the right independently of the carriage. The function of washer 236 is to lock carriage 233 with respect to shaft 221 to prevent movement to the right of carriage 233, when axle 238 moves to the right. Therefore, if the axle 238 be periodically moved to the left by a predetermined distance the carriage 233 will move in periodic steps to the left by the same distance. Periodic motion of the axle 238 in this manner is accomplished by means of the cam surface 243 of the cylindrical end cam 37 in which the axle is journaled, that cam surface exerting pressure on the cam rider studs 244 of the axle 238. Spring 245 biases axle 238 to the right for return movement. Periodic rotation of the cam 37 and its cam surface is accomplished in timed relation to the other elements of the paper premeasuring mechanisms by operation of the arm 246 affixed to the cam 37. This arm is periodically rotated during the winding of a coil by the following mechanisms cooperating with cam 38 and consequently with the paper advancing supply arm of the paper supply mechanisms already described.

Referring again to Fig. 7 in particular but also Figs. 1, 6, 11 and 13, it will be seen that arm 246 is operable by cam 38 by means of a linkage including arms 247 and 248 and arm 249 of lever 203. Arm 248 is rotatably linked to arm 249 at journal 250 and is pivoted about an adjustable pivot 251; arm 247 connects its upper end with arm 246. Consequently, when cam roller 205 rides from the lower to the upper level of cam 38, arm 246 will be rotated and axle 238 will advance to advance carriage 233. Axle 238 will, of course, be returned by spring 245 when cam roller 205 returns to the lower level of cam 38. By adjusting the pivot 251 of arm 248 the extent of traverse of axle 238 may be adjusted. This may be accomplished by use of the rack and pinion mechanism comprising pinion gear 252, rack 253 on which pivot 251 is positioned and adjusting handle 254.

It will be apparent, therefore, that carriage 233 is advanced step by step toward the left of the machine as a coil is wound, the advancement occurring at the same tim that paper is advanced by the paper supply mechanisms. Return motion of the carriage 233 to the right for the resumption of its step by step motion to the left for the winding of the next coil or series of coils may be accomplished by use of the mechanisms described in the following.

Figure 28:
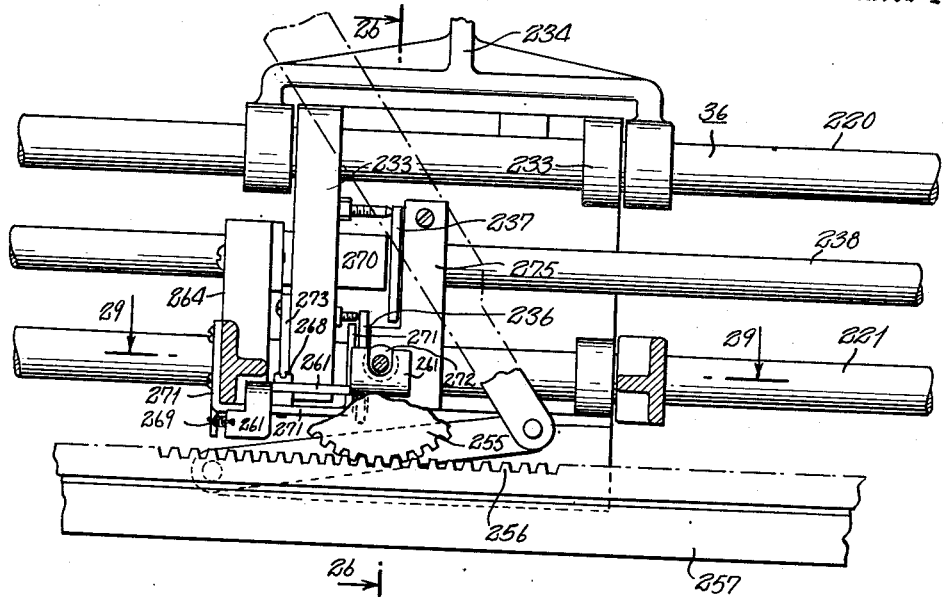
Figure 29:
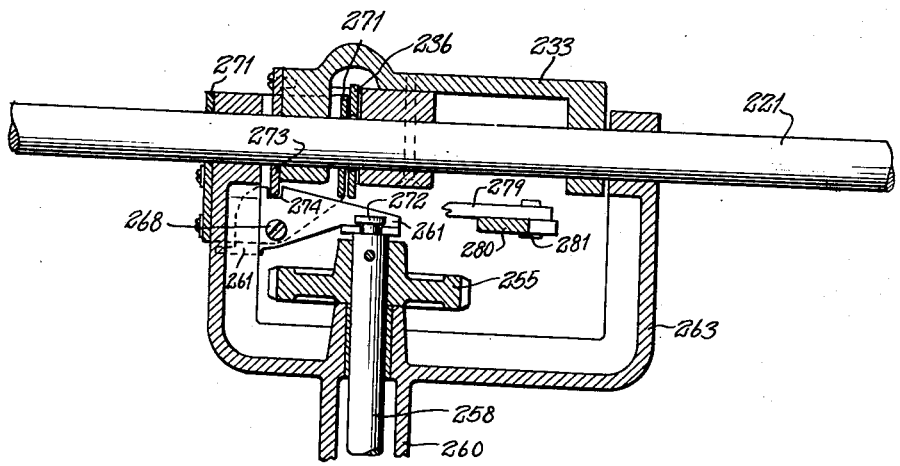
Figure 32:
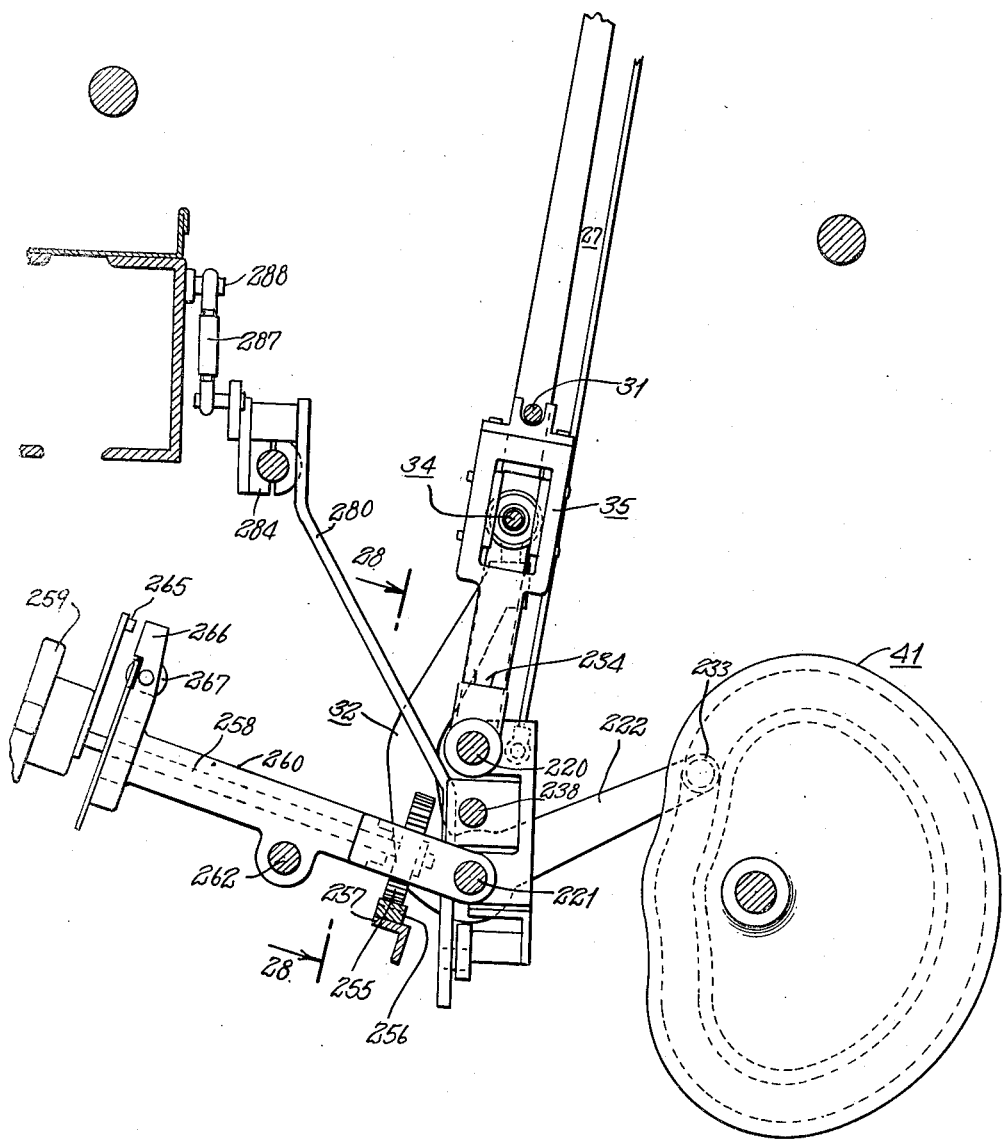

The mechanisms for manually setting the lateral position of carriage 233 on the axles 220, 221 and 238 and releasing washers 236 and 237 to permit such setting are best seen from such figures as Figs. 25, 26, 28 and 29 although partially visible in Figs. 2 and 32. Fig. 28 is a partial fragmentary front view of these mechanisms corresponding to the central part of Fig. 2 and also to a cross-section along line 28—28 of Fig. 32. Fig. 29 is a generally horizontal cross-section of Fig. 28 taken along the line 29—29 thereof; Fig. 26 is a vertical cross-section along its line 26—26; Fig. 25 is a left side plan view similar to Fig. 26; while Fig. 32 is a similar right side plan view.

Referring to the latter figures, carriage 233 may be driven to the left or right by pinion gear 255 riding on rack 256 affixed to the frame castings 152 and 153 as by a supporting bar 257. Pinion gear 255 is affixed to and rotatable by shaft 258 having manually operable knob 259 for the purpose. Shaft 258 is supported in housing 260 for the required rotary motion and also for a slight amount of axial movement such that its inner tip may actuate lever 261 as hereinafter explained. Housing 260 is slidably mounted on shaft 262 mounted in frame castings 152 and 153 and slightly forward of axles 220, 221 and 238; it includes a yoke-like portion 263 slidable on shaft 221 and having an extension 264 slidable on shaft 238. Arm 265 on knob 259 comprises a limit stop member engageable with adjustable limit stop 266 (adjustable with screw 267) on housing 260. By this means the rotation of shaft 258 and pinion gear 255 may be limited in order to preset the mechanism for predetermined inner diameters of coils being wound as hereinafter more fully explained.

For the purpose of releasing the engagement of shafts 221 and 238 by washers 236 and 237 respectively when it is desired to move carriage 233 with handle 259 and the rack and pinion mechanism, the following are provided. Journaled at 268 on yoke-like portion 263 is the lever 261 biased to the position shown in Fig. 29 by spring 269, i. e., to a position in which carriage 233 is slightly separated from extension 264 and the left hand side of yoke-like portion 263. Sleeve 270 extends from extension 264 around shaft 238 into the proximity of washer 237. U-shaped bracket 271 extends similarly from portion 263 into the proximity of washer 236. Grooved stud 272 on shaft 258 engages the right end of lever 261. Stud 273 on carriage 233 projects into groove 274 of lever 261.

It will be apparent that if shaft 258 be pushed inwardly by pressure on knob 259, lever 261 will rotate and, by engagement of stud 273, draw carriage 233 and portion 263 (including extension 264) together at the left. Thereby sleeve 270 and U-shaped bracket 271 will engage washers 237 and 236 respectively and flattening them against block 275 of carriage 233. Thereupon carriage 233 may be moved freely by the rack and pinion gears upon rotation of knob 259.

It will be understood that the progressive advance of the arm 35 toward the left in Fig. 21 as a coil is wound will translate the motion of the paper premeasuring operator arm 32 so as to move the paper premeasuring and insertion arm 27 progressively greater distances toward the front of the machine each time that arm 32 operates, i. e., the distance moved between the positions shown in Figs. 14 and 15, the premeasuring distance, will progressively increase as a coil is wound.

The paper insertion mechanisms

The paper insertion mechanisms for advancing the paper premeasuring and insertion arm 27 from the position shown in Fig. 15 to Fig. 16 are better visualized by reference to the Figs. 21 and 13. Paper insertion operator arm 33 is freely rotatable upon the fixed shaft 221 and includes on its arm 276 a cam roller 277 cooperating with the groove 278 in the cam 40. When the cam roller 277 moves to the high level position on the cam 40 the paper insertion operator arm will move the cross-rod 34 forward thereby advancing the paper premeasuring and insertion arm 27 forward from the position shown in Fig. 15 to that shown at Fig. 16 and the end of the paper strip which has been premeasured will be fed into the coil as it is wound on arbor 9.

As previously suggested and later detailed, cams 40 and 41 are so shaped that at the end of the forward traverse of member 27 both arms 32 and 33 move forward quickly and in unison to thrust the leading edge of the paper quickly into the coil being wound.

COIL DIAMETER COMPENSATOR MECHANISMS

In order to provide for a gradual raising of the guide rollers 6 as well as the paper insertion mechanisms as the diameter of coils being wound gradually increases, the entire framework of castings 152 and 153 and the elements supported by them is caused to be rotated upwardly about journals 185 and 186 in synchronism with the advance of carriage 233 leftward. The initial position from which the rise begins may be controlled by knob 259 and its associated rack and pinion mechanism as will be described later. For this purpose, there may be provided the linkage best shown in Figs. 30, 31 and 32 but also shown partially in the center of Fig. 2 as well as in Figs. 25, 26, 28 and 29. Fig. 30 is a front view of the linkage in the uppermost raised position of the castings 152 and 153; Fig. 31 is a section along lines 31—31 of Fig. 30.

Bearing in mind that shafts 226, 220 (same as 36), 238 and 221 are fixed with respect to each other in castings 152 and 153 and are thus rigid parts of the frame which gradually rises as stated above, the linkage comprising arms 279 and 280 are journaled at 281 for free rotation with respect to each other as carriage 233 slides, journal 281 may move up and down by virtue of the fact that arm 279 is journaled for rotation with respect to carriage 233 at extension 282 thereof, and arm 280 is journaled (journal 283) to clamp 284 affixed on shaft 226. Link arm 285 is also journaled for rotation at journal 283 but also at the journal end 286 of link 287 which suspends itself and the entire framework associated with the castings 152 and 153 from the table-like structure 2 at fixed journal 288. Thus, as carriage 233 moves to the right (Fig. 30), arms 279 and 280 tend to "buckle" about their journal 281 thereby relieving upward thrust on journal 283 and permitting arm 285 to rotate counterclockwise to lower the framework of castings 152 and 153 (with its carriage 233, shafts 226, 220, 238, 321, etc.) by virtue of the weight thereof; conversely, as carriage 233 moves to the left (Fig. 30), the arms 279 and 280 tend to "straighten" or align with each other in which case the upper end of arm 280 exerts a thrust on journal 283 thereby rotating arm 285 about journal 286 and consequently raising the entire framework associated with castings 152 and 153 with respect to table-like structure 2.

It will be apparent that as carriage 233 is progressively shifted to the left by the action of hub 37 already described, the linkage just described will progressively raise the framework of castings 152 and 153 and thereby also guide rollers 6 and the paper insertion arm 27. The same will be lowered to its initial position when carriage 233 is returned to its starting position by operation of knob 259.

MISCELLANEOUS

The cam system comprising cams 38 to 42 on shaft 43 which is journaled for rotation in and movable with the rotary motion of castings 152 and 153 about journals 185 and 186, may be driven in synchronism with the traverse mechanisms and arbor 9 by any suitable means such as the chain drive 289 (Figs. 3 and 13) interconnecting gear box 14 and gear 290 on shaft 43, the idler 291 being provided to take up slack. Universal link 292 in shaft 43 may be provided to accommodate the up and down motion of shaft 43 as the castings 152 and 153 rotate. Except as pointed out under the next following heading, the synchronism is such that paper is inserted into the coil being wound at approximately the moment when the wire reverses its direction of winding lengthwise of the coil (i. e., at the end of one layer).

Arbor or arbors 9 are preferably provided with suitable means for fastening the ends of wire 8 thereto at the beginning of winding. For example, a longitudinal spline locking in a longitudinal groove (not shown) of arbor 9 may be provided.

Prevention of oval shaping

The foregoing arrangements, because of the random "hunting" characteristics pointed out below, have been found to exhibit still another novel and advantageous feature, namely that they avoid an oval shaping of the coils which would occur due to slight overlapping of the ends of each strip if all leading edges of the paper were grasped between the wire and coil at the same peripheral point of the coil as it is being wound, e. g., if the leading edges all engaged the coil at a peripheral point or longitudinal peripheral line corresponding to some fixed radius of the coil. But these "hunting" characteristics cause the leading edges of successive severed paper strips to be grasped between the wire and coil at continuously changing radii or points circumferentially of the coil. Because the hunting is irregular, these peripheral points or radii for the successive premeasured strips are selected more or less at random, i. e., each of the successive leading edges of the paper will be grasped between the rotating coil and wire at a random peripheral point "earlier" or "later" than the corresponding point of its predecessor; or "earlier" or "later" phasewise from some fixed radius of the coil. Although the distribution is random, nevertheless, it is found that the leading edges will be distributed with sufficient average uniformity around the coil periphery that the points of overlapping of the opposite ends of the various strips will likewise be distributed around the periphery with sufficient average uniformity to avoid oval shaping.

This effect is caused by the fact that the variable ratio transmission 13 exhibits a certain amount of "hunting," i. e., its speed will vacillate by a small amount above and below its design speed, and this "hunting" increases in amount as the speed of the transverse mechanisms and paper premeasuring and insertion mechanisms increase. Further, there is a certain amount of similar "hunting" of the paper premeasuring and insertion mechanisms caused by the looseness of the link 292 and gear box 14. Assuming then, for example, that the speed of the spindle rotating the coils is fairly uniform and free of "hunting" because of the load imposed thereon by the wires being fed to it or by other factors, it will be understood that the "hunting" will cause some slight phase displacement between the approach of the arm 27 and the rotation of the coil and this will cause the paper leading edge to be inserted into the coil at earlier or later phase moments, i. e., the leading edge will lead or lag some fixed coil radius, or the moment when the wire reverses its direction of winding lengthwise of the coil. Since this occurs at random, the foregoing result is accomplished.

Motor control circuits

Figure 35:
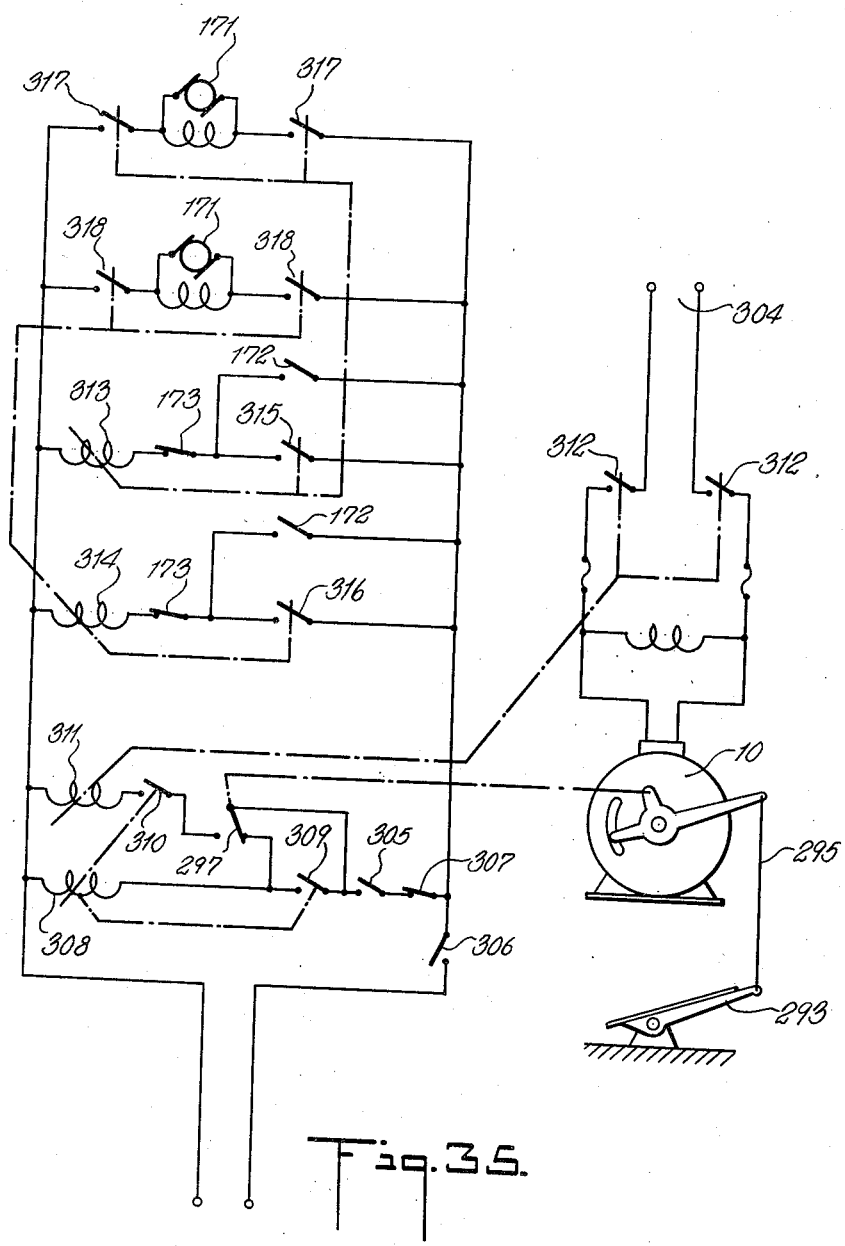

For controlling the energization of brush shifting variable speed motor 10 to initiate or stop winding and control its speed, any suitable means may be provided such as the pedals 293 rotatable on shaft 294 and governing the brush position of the motor through the linkage 295 and the control circuit shown in Fig. 35.

Shift lever plate 296 is rotatably attached to the frame of motor 10. Snap action switch 297 is affixed to motor 10 in position to be operated by cam 298 of shift lever plate 296. Affixed to the upper end of the shift lever plate is gusset plate 299. Gusset plate 299 is joined to the upper end of crank arm 300 by an adjustable link 301. Motor 10 is connected to double pulley 302 by shaft 303.

A circuit for energizing and controlling the prime mover, motor 10, as well as the motors 171 which motivate the paper supply mechanisms is illustrated by the Fig. 35. For the most part, the switches, relays, etc., are shown in the positions which they will take (normally opened or normally closed) when the system is at rest.

Motor 10 is energizable from any suitable source of electric power 304 through circuits which will be readily apparent to those skilled in the art. Control of the energization of motor 10 is effected by the switches and relays indicated in the lower left-hand portion of the figure which are actuated by the pedals 293 in the following manner. It is to be understood that when the pedals 293 are depressed toward the floor to their full extent, the brushes of motor 10 will be in such position as to cause maximum speed of the motor, whereas in their extreme upward position the brushes are in a position of zero speed for the motor, intermediate positions corresponding to intermediate speeds. Let it be supposed that it is desired to initiate operation of the machine from a condition of complete inactivity. In that event the operator will first set a counter mechanism (controlled by counter 99) which is to control automatically the number of turns of wire to be wound. This counter may be arranged initially to close a switch 305 and to open it after the predetermined number of turns have been wound. The operator will then close the switch 306 and raise the pedals 293 to their upward (minimum speed) position which will throw the snap action switch 297 to its right-hand position as shown. Thereupon a circuit will be established through switch 306, normally closed switch 307 (function to be indicated later), switch 305, the left-hand contact of switch 297 and the relay 308. Relay 308 will then close the open biased switches 309 and 310. The operator may then begin to depress the pedals 293 and a slight downward movement of them will cause the switch 297 to snap to its left-hand contact which will permit energization of the relay 311 and consequently the closure of the switches 312 actuated by the latter relay to apply power to motor 10. The machine will thereupon initiate its operation and the speed thereof will be determined by the degree to which the operator depresses the pedals 293. The machine will continue to run until the predetermined number of turns have been wound whereupon the switch 305 will automatically be open to deenergize the entire motor 10 control circuit by the deenergization of relay 308 and consequently relay 311 by virtue of the opening of switches 309 and 310. Switches 312 of course will open with the deenergization of relay 311.

It will be apparent that the motor 10 will be deenergized also if the pedals 293 be raised to the point where they will snap the switch 297 back to its right-hand contact position.

The switch 307 is representative of a circuit which will inactivate the entire system by deenergizing motor 10 if there should be a breakage in any of the wires being wound. Switch 307 is automatically closed so long as the wire is intact; it is automatically opened if any wire breaks. Since circuits for accomplishing this actuation of the switch 307 are well known to those skilled in the art, the details are not shown.

To be noted is the fact that this arrangement renders it impossible for the operator to initiate operation of the motor 10 if the pedals 293 are initially in a depressed high-speed position which might otherwise cause the motor suddenly to start at high-speed with destructive results to the machinery and wires or danger to the operator. The operator must always bring the pedals back to their elevated zero speed position before the circuit will energize the motor. This comes about because switches 309 and 310 are normally open and cannot be closed until relay 308 is energized; and relay 308 cannot initially be energized until switch 297 has at least temporarily been placed in its right-hand contact position by raising the pedals 293. After relay 308 has once been energized in this way, the switches 309 and 310 will remain closed despite the actuation of switch 297 to its left-hand position because relay 308 may remain energized through the circuit of the switches 309, 305, 307 and 306.

The control of the motors 171 driving the paper supply mechanisms is as follows. Whenever the upper limit switches 172 are momentarily closed by upward motions of the rods 180 (these switches 172 automatically open when the rods are lowered), they close a circuit which energizes the relays 313 and 314 so long as the switch 306 is closed. Relays 313 and 314 thereupon close, and hold closed, the normally open switches 315 through 318 to energize the motors 171 which roll the paper downward. Switches 315 and 316 hold the relays in energized condition despite the fact that switches 172 have been opened by the downward motion of the rods 180. When the rods 180 reach their lowest point they momentarily open the normally closed switches 173 thereupon deenergizing the relays 313 and 314 and consequently deenergizing the motors 171. As the rods 180 again rise, switches 173 again close, but the circuit of relays 313 and 314 cannot be reestablished until the rods again close the upper limit switches 172.

OPERATION

For purposes of explanation of the overall operation of the machine, let it be assumed that it is desired to wind a plurality of solenoid coils of predetermined inner and outer diameters and axial length, the wire portion consisting of successive spirally wound layers of the type well known in electric coil practice. The coils, with or without a prepared core member may be begun at a number of positions along the arbor 9 by attaching to the arbor for each coil or coil form the end of a wire 8 drawn from one of the spools 3 over the corresponding pulleys 4 and 5 and through the guide grooves 164 in the guide roller or rollers 6 (preferably around the front side of the upper roll and the rear of the lower).

Before commencement of winding, the variable ratio transmission 13 will have been adjusted by means of the dial 103 to provide for a speed of traverse with respect to a speed of rotation of the arbor of the guide roller 6 appropriate of the number of winding turns per unit length of coil; and the extent of traverse will have been adjusted appropriately to the axial length of the individual coils by positioning the slide 18 with the handle 139, the pointer 150 of scale of 151 affording a measure of the extent of traverse. Adjustment of the initial vertical position of the guide rollers 6 to bring them into proximity with the predetermined initial or inner diameter of the coil being wound will have been made by the use of the knob 259 and its associated rack and pinion mechanism to position the carriage 233 at such initial longitudinal position as will raise or lower the entire framework associated with the frame castings 152 and 153 to a point where the rollers 6 will be at the proper height. It will be apparent that the same action will appropriately adjust the paper premeasuring mechanisms so that the amount of paper premeasured will initially correspond to the predetermined inner diameter of the coil. This, of course, follows by the positioning of the pivot arm 35 by means of the carriage 233. Any subsequent return motion of the carriage may be limited to its initial longitudinal position corresponding to the inner coil diameter by means of the limit mechanism of lock nut-bolt and stop arrangement 265 to 267 which limits the clockwise motion of the knob 259 when the operator is moving the carriage to the right. It will be understood that a certain additional amount of adjustment of the vertical position of the guide rollers 6 may be made by use of the rack and pinion mechanism controlled by the handle 160. This, however, is normally a fixed adjustment made in constructing or servicing the machine and is not one which the regular operator would ordinarily use.

In order to adjust the various mechanisms to accommodate the progressive increase of the coil diameter to its ultimate predetermined outer diameter, which increase depends upon the thickness of the paper being used as well as the diameter of the wire being used, the pivot point 251 of the arm 248 may be appropriately positioned by use of the knob 254 and its associated rack and pinion mechanism. Thereby the rate of advance toward the left of the carriage 233 caused by the described action of cylindrical end cam 37 may be made large or small depending upon whether thick or thin wire and paper are used. It will be understood that this adjustment will provide not only for the appropriate incrementation of the progressive rise of the rollers 6 during winding but also for the appropriate progressive increase in the advancement by the paper advancing supply arm and the length of premeasured paper, the increase in these factors likewise being large or small depending upon whether thick or thin wire and paper are used.

When the operator has once started the winding of a coil the guide rollers 6 will reciprocate in the manner previously described and, in timed relation thereto, the paper premeasuring and insertion mechanisms will perform as follows. Assume that at the beginning of the winding of the first layer of the series of coils the paper insertion mechanisms have just inserted the leading edge of a first premeasured strip beneath the wires; the leading edge having been grasped between the wires and the arbor 9 so that the strip is wound beneath the wire as further rotation of arbor 9 ensues. While the traverse mechanisms are completing the winding of the first layers, the arm 27 will: return to the position shown in Fig. 14 (by action of both paper premeasuring and insertion operator arms 32 and 33); grasp the continuous paper strip and move forward to the position shown in Fig. 15 (by operation of the paper premeasuring operator arm 32 which has been moved forward by the cam 41); and will deliver the next premeasured and cut strip to the coils approximately as the traverse mechanisms are beginning the winding of their second layers (by operation of paper insertion operator arm 33 which has been moved forward by the cam 40). Thereupon the action will repeat itself for each additional layer of wire, cam 38 and its associated mechanisms providing for periodic advance of paper from ramp 182, the appropriate increases in premeasured paper strip length, and height of rollers 6; cam 42 providing for the cutting of the paper by knife 30 while arm 27 is at the Fig. 15 position; and cam 39 providing for the opening of the jaw mechanisms on arm 27 long enough to receive the paper strip at the position of Fig. 14.

The manner of synchronizing all of these actions is probably best illustrated by reference to the Fig. 13 with the aid of the Fig. 27 illustrating the phase relations of the cams 38 to 42 as they rotate on shaft 43. The manner in which the traverse mechanisms may be phased to synchronize them with these cams and the consequent motions of the paper control mechanisms will be readily understood. For convenience of illustration, Fig. 27 has been drawn on an assumption that all cam rollers are positioned at the same angle to the vertical plane through the axis of their respective cams. As Fig. 13 indicates, this is actually only approximately so in the machine as disclosed but it will be understood that the various phase relations may be obtained with equal facility regardless of the angular positions of the cam rollers provided appropriate changes are made in the orientation of the cams on shaft 43. Also, for convenience in interpreting the Fig. 27, it is assumed that these cam rollers are rotating counterclockwise about their respective cams (while stationary) through a series of positions, A, B, C, D, etc. It will be understood that analytically the result is the same. Further in the interest of clarity of illustration, the scales of some cams in Fig. 27 have been reduced to avoid confusion in the drawing; again the analytical result is unchanged. Note that from a position just short of A to position C the cams 40 and 41 have the same shape.

Referring now to the Fig. 27, assume that the continuously repeated cycle begins with the initiation of winding of the first layer of wire on the series of coils along arbor 9 at which time the paper insertion mechanisms have just inserted the leading edge of a first premeasured strip beneath the wires, as stated above. At this time, the various cam rollers will have an angular position with respect to their cams corresponding to the position A on the Fig. 27. As further rotation of the cams takes place, the rollers will proceed successively by continuous movement to position corresponding to the successive positions A, B, C, D, E, and F. It will be seen that in proceeding from the position A to the position B, the rollers on cams 40 and 41 will drop from the upper to the lower levels of each which means that the operator arms 32 and 33 will move the paper premeasuring and insertion arm 27 back to the position shown in Fig. 14. In the same A—B interval cam 38 will cause no action since its roller remains upon its lower level of unchanging radius throughout the interval. The same is true of the cam 42 and substantially so of cam 39.

As the rollers approach the position B, the cam roller on the cam 39 will rise from the lower to the upper level portion, both of unchanging radius, and remain there until just short of position C thereby opening the jaws on arm 27 just before B and closing them just before C by the converse action. Simultaneously, in the interval B—C, the roller on cam 38 will rise from the lower to upper level and cause the paper strip to be fed into the jaw over the ramp 182, and an advance in the carriage 233 to provide both for the lengthening of the premeasured strip and a rising of the rollers 6. Cams 40 and 41 are inactive for the interval B—C because the rollers are on portions of unchanging curvature. As the rollers pass the position C, cam 38 ceases further action until position D is reached because its roller is on an upper level of unchanging curvature during the C—D interval. As the rollers proceed from the position C to the position D, the arm 27 will draw out and premeasure the appropriate length of paper by virtue of the fact that the roller on the cam 41 rises from a lower to the upper level; however, cam 41 causes no further action until just short of A since the roller on cam 41 is on a portion of unchanging radius between D and just short of A. In proceeding from C to D, cam 40 undergoes a reduction of its radius which causes the insertion arm 33 to move rearward slightly as the arm 32 begins its forward movement. This is for the reasons previously stated of permitting premeasuring of very short length strips. Shortly after the position D is reached the cam 42 comes into action to raise its roller from its lower to its upper level thereby operating the knife 30 in the interval between D and E. Arm 27 is at rest at this point between the positions D and E by virtue of the fact that both the rollers on cams 40 and 41 are on sections of unchanging radius, lower and upper level respectively. During the interval D—E the roller on cam 38 recedes to the lower level of cam 38 whereby its associated mechanisms return to a position in which they are prepared for their next actuation during the period B—C. As the position E is reached it will be apparent that the cam 40 comes into play to raise its cam roller from the lower to the upper level thereby moving the arm 27 forward for the paper insertion movement which is completed at A by the introduction of the leading edge of the premeasured cut strip into the coil; except near the end, the cam 41 is inactive during this period by virtue of the fact that its roller is on an upper level of unchanging radius. Note that near the end of the E—A period both cams experience an additional rise just before A. This produces the final rapid insertion movement by both arms 32 and 33 in order that the paper be inserted quickly and uniformly. Cam 42 is, of course, substantially inactive except for the period D—E by virtue of the fact that its cam roller rides on an unchanging radius for all but this interval. Having reached the position A again, it will be understood that the cycle may repeat itself as successive layers of coil are wound.

What is claimed is:

1. In combination in a machine for winding wire coils, a base having thereon spindle means adapted to receive and rotate a coil being wound, a framework journalled on said base and rotatable with respect to said base and said spindle means, linkages interconnecting said base and framework for rotating said framework with respect to said base and spindle means whereby the distance between said spindle means and the hereinafter-mentioned guide and insertion arm may be varied, a linearly reciprocatable guide on said framework for winding successive solenoidal wire layers of progressively increasing diameter, and rotary cyclically operable paper feed means on said framework for inserting premeasured lengths of separating material intermediate said layers, said cyclically operable means comprising, a rotary reciprocatable paper supply advancing arm on said framework for periodically advancing a continuous strip of said material to the hereinafter mentioned material premeasuring and insertion arm, a reciprocatable rotatable premeasuring and insertion arm on said framework including a jaw mechanism for periodically grasping said strip, cyclically operable material premeasuring mechanisms adapted to rotate said premeasuring and insertion arm from a strip receiving position while said jaw mechanism grasps said strip to a premeasuring position to premeasure a predetermined length of said strip, severing means on said framework for severing said length while said arm is at said premeasuring position, material insertion mechanisms adapted thereafter to rotate said premeasuring and insertion arm to an insertion position to insert said severed length between successive such solenoidal layers as the winding of the latter thereof commences, and cam mechanisms operable in timed relation to said guide for actuating the cyclic operation of said supply arm, said jaw mechanism, said severing means and said material premeasuring and insertion arm, said cam mechanisms being adapted cyclically to actuate the same to: move said premeasuring and insertion arm to said receiving position and open said jaw mechanisms, cause said supply arm to advance said strip, close said jaw mechanism and advance said premeasuring and insertion arm to said premeasuring position, actuate said severing means, move the latter arm to said insertion position and thereafter repeat the actuation cyclically in the order indicated.

2. A combination as in claim 1 including cam means operable in synchronism with said guide for periodically operating upon said linkages to increment periodically the distance between said spindle means and guide and insertion arm, and mechanisms interconnecting said material premeasuring mechanisms and said latter cam means and adapted also periodically to increment the distance between said receiving and premeasuring positions of said arm for successive cyclic operations thereof whereby progressively to increase said predetermined lengths on successive cyclic operations of said arm to accommodate increasing diameters of said solenoidal layers as wound.

3. A combination as in claim 2 including mechanisms interconnecting said supply arm and said cam means and adapted also periodically to increment the advance of said strip by said supply arm.

4. A combination as in claim 3 in which said cam means include means for adjusting the magnitude of the periodic increments.

5. A combination as in claim 2 in which said cam means include means for adjusting the magnitude of the increments in said distances.

6. In a machine for preparing and delivering changing lengths of sheet-like material, material premeasuring and delivery mechanisms adapted cyclically to receive a continuous strip of said material, premeasure and sever a length therefrom, and deliver said length to a suitable receiving device, comprising, a material premeasuring and delivery arm rotatable about and pivoted at two points along an axis, a movable member adapted to engage said arm at selectable positions longitudinally of said axis for rotating said arm about said axis, said positions being along radii extending from said axis at points intermediate said two points, means for moving said movable member longitudinally of said axis, a lever engageable with said member for moving the same to rotate said arm by distances corresponding to the distances from the ends of said lever to the point of engagement with said member, a material premeasuring operator and a material delivery operator each pivotally engaging one of the ends of said lever and constituting a pivot point for rotation of said lever by the other operator, and control devices for successively moving first said premeasuring operator and then said delivery operator to rotate said lever whereby said material premeasuring and insertion arm may be caused first to rotate about said axis from a material receiving position to premeasure one of said lengths and then to rotate further about said axis to deliver said one of said lengths, said control devices including means for thereafter moving said operators to rotate said premeasuring and delivery arm back to said receiving position whereby the rotation thereof may be repeated in successive cyclic strokes.

7. In a machine as in claim 6, means included within said control devices for causing said delivery operator to move in a direction opposite to its motion during the successive motions of said operators at the time said premeasuring operator begins to move and by an amount sufficient to maintain the said point of engagement between said movable member and lever substantially stationary with respect to said axis when said movable member is at its extreme position along said lever in the direction of said delivery operator.

8. In a machine as in claim 6, means included within said control devices for causing both said operators to move in unison after and in the direction of their motions during their successive motions.

9. In a machine as in claim 6, mechanisms as claimed in which said means for moving said movable member longitudinally of said axis includes a device adapted so to move said member a predetermined distance for each stroke of said premeasuring and delivery arm whereby said movable member engages said lever at progressively changing distances from said operators and said lengths are progressively changed on successive such strokes.

10. In a machine as in claim 9 including a stationary structure and a receiving device for said lengths affixed thereto, a supporting structure supporting the claimed premeasuring and delivery mechanism and adapted to be moved with respect to said receiving device whereby said mechanisms may deliver said lengths thereto at varying distances therefrom, and compensator mechanisms for progressively varying the distances from said receiving device from which said lengths are delivered, said compensator mechanisms comprising a variable linkage interconnecting said supporting structure and stationary structure, and a connection between said linkage and said device included in said means for moving said member longitudinally of said axis, said connection being so constructed and arranged as to actuate said linkage to move said supporting structure with respect to said stationary structure a predetermined distance for each stroke of said premeasuring and delivery arm.

11. In a machine as in claim 10, a reciprocatable material advancing supply arm controlled by said control devices for supplying said material to said premeasuring and delivery arm in timed relation to its cyclic strokes, and means controlled by said compensator mechanisms for progressively changing the stroke length of said supply arm as said lengths are progressively changed.

12. In a machine as in claim 9 a reciprocatable material advancing supply arm controlled by said control devices for supplying material to said premeasuring and delivery arm in timed relation to its cyclic strokes, and means operable in timed relation to said device adapted to move said member a predetermined distance for progressively changing the stroke length of said supply arm as said lengths are progressively changed.

13. In a machine for winding progressively increasing lengths of sheet-like material into coil form, material premeasuring and insertion mechanisms adapted cyclically to receive a continuous strip of said material, premeasure and sever a length therefrom, and insert said length into a rotating coil form, comprising, a material premeasuring and insertion arm rotatable about and pivoted at two points along an axis, a movable member adapted to engage said arm at selectable positions longitudinally of said axis for rotating said arm about said axis, said positions being along radii extending from said axis at points intermediate said two points, means for moving said member longitudinally of said axis, a lever engageable with said member for moving the same to rotate said arm by distances corresponding to the distances from the ends of said lever to the point of engagement with said member, a material premeasuring operator and a material insertion operator each pivotally engaging one of the ends of said lever and constituting a pivot point for rotation of said lever by the other operator, and control devices for successively actuating first said premeasuring operator and then said insertion operator to rotate said lever whereby said material premeasuring and insertion arm may be caused first to rotate about said axis from a material receiving position to premeasure one of said lengths and then to rotate further about said axis to insert said one of said lengths into a coil form, said control devices including means for thereafter actuating said operators to rotate said premeasuring and insertion arm back to said receiving position whereby said rotations thereof may be repeated in successive cyclic strokes.

14. In a machine as in claim 13, means included within said control devices for causing said delivery operator to move in a direction opposite to its motion during the successive motions of said operators at the time said premeasuring operator begins to move and by an amount sufficient to maintain the said point of engagement between said movable member and lever substantially stationary with respect to said axis when said movable member is at its extreme position along said lever in the direction of said delivery operator.

15. In a machine as in claim 13, means included within said control devices for causing both said operators to move in unison after and in the direction of their motions during their successive motions.

16. In a machine as in claim 13, mechanisms as claimed in which said means for moving said member longitudinally of said axis includes a device adapted so to move said member a predetermined distance for each stroke of said premeasuring and insertion arm whereby said member engages said lever at progressively decreasing distances from said premeasuring operator and said lengths are progressively increased on successive such strokes.

17. In a machine as in claim 16 including a stationary structure and a rotatable member thereon adapted to hold a coil form for winding, a supporting structure supporting the claimed premeasuring and insertion mechanisms and adapted to rotate with respect to said rotatable member whereby said mechanisms may insert said material into said coil form at varying distances from said rotatable member, and compensator mechanisms for progressively increasing the distances from said rotatable member at which said material is inserted, said compensator mechanisms comprising a variable linkage interconnecting said supporting structure and stationary structure, and a connection between said linkage and said device included in said means for moving said member longitudinally of said axis, said connection being so constructed and arranged as to actuate said linkage to rotate said supporting structure with respect to said stationary structure a predetermined distance for each stroke of said premeasuring and insertion arm.

18. In a machine as in claim 17, mechanisms as claimed in which said control devices include means for so moving said device included in said means for moving said member, and said control devices comprise a continuously rotatable shaft having a plurality of cams thereon, said cams being connected to and phased to control said operators and said device included in said means for moving said member in predetermined time relationship during each stroke of said premeasuring and insertion arm.

19. In a machine as in claim 18, mechanisms as claimed including severing means for severing said lengths, and a cam on said shaft connected to and for operating said severing means in timed relation during said strokes.

20. In a machine as in claim 18, mechanisms as claimed including means for supplying said continuous strip to said premeasuring and insertion arm, and a cam on said shaft connected to and operating said means for supplying in timed relation during said strokes.

21. In a machine as in claim 17, a reciprocatable material advancing supply arm controlled by said control devices for supplying said material to said premeasuring and delivery arm in timed relation to its cylic strokes, and means controlled by said compensator mechanisms for progressively changing the stroke length of said supply arm as said lengths are progressively changed.

22. In a machine as in claim 16 a reciprocatable material advancing supply arm controlled by said control devices for supplying material to said premeasuring and delivery arm in time relation to its cyclic strokes, and means operable in timed relation to said device adapted to move said member a predetermined distance for progressively changing the stroke length of said supply arm as said lengths are progressively changed.

23. In a machine for winding progressively increasing lengths of sheet-like material into coil form, material premeasuring and insertion mechanisms adapted cyclically to receive a continuous strip of said material, premeasure and sever a predetermined length therefrom and insert said length into a rotating coil form, comprising, a substantially U-shaped premeasuring and insertion arm having the outer ends of its side arms mounted for rotation about an axis, a movable member adapted to engage said arm at selectable positions longitudinally of said axis for rotating said arm about said axis said positions being along radii extending from said axis at points intermediate said side arms, means for moving said member longitudinally of said axis, a lever engageable intermediate its ends with said member for moving the same to rotate said arm by distances corresponding to the distances from the ends of said lever to the point of engagement with said member, a material premeasuring operator arm and a material insertion operator arm each generally rotatable in the direction of rotation of said premeasuring and insertion arm and each pivotally engaging one of the ends of said lever and constituting a pivot point for rotation of said lever by the other operator arm, and control devices for successively rotating first said premeasuring operator arm and then said insertion operator arm to rotate said lever whereby said lever may cause said material premeasuring and insertion arm first to rotate about said axis from a material receiving position to premeasure one of said lengths and then to rotate further about said axis to insert said one of said lengths into a rotating coil form, said control devices including means for thereafter rotating said operator arms to rotate said premeasuring and insertion arm back to said receiving position whereby the rotation thereof may be repeated in successive cyclic strokes.

24. In a machine as in claim 23, means included within said control devices for causing said insertion operator arm to rotate in a direction opposite to its rotation during the successive rotations of said operator arms at the time said premeasuring operator arm begins to rotate and by an amount sufficient to maintain the said point of engagement between said movable member and lever substantially stationary with respect to said axis when said movable member is at its extreme position along said lever in the direction of said insertion operator arm.

25. In a machine as in claim 23, means included within said control devices for causing both said operator arms to rotate in unison after and in the direction of their motions during their successive motions.

26. In a machine as in claim 23, mechanisms as claimed in which said means for moving said member longitudinally of said axis includes a device movable generally in the direction of said axis and adapted so to move said member a predetermined distance for each stroke of said premeasuring and insertion arm whereby said member engages said lever at progressively decreasing distances from said premeasuring operator arm and said lengths are progressively increased on successive such strokes.

27. In a machine as in claim 26 including a stationary structure having thereon a rotatable member adapted to hold a coil form for winding, a reciprocatable member for guiding the winding of wire on said coil form, a supporting structure supporting the latter reciprocatable member and the claimed premeasuring and insertion mechanisms and adapted to rotate with respect to said rotatable member whereby said reciprocatable member may guide wire and said mechanisms may insert said material into said coil form at varying distances from said rotatable member, and compensator mechanisms for progressively increasing the distances from said rotatable member from which wire is so guided and said material is so inserted, said compensator mechanisms comprising a variable linkage interconnecting said supporting structure and stationary structure, and a connection between said linkage and said device included in said means for moving said member longitudinally of said axis, said connection being so constructed and arranged as to actuate said linkage to rotate said supporting structure with respect to said stationary structure a predetermined distance for each stroke of said premeasuring and insertion arm.

28. In a machine as in claim 27, mechanisms as claimed in which said control devices include means for so moving said device included in said means for moving said member, and said control devices comprise a continuously rotatable shaft on said supporting structure rotatable in timed relation to said reciprocatable member and having a plurality of cams thereon, said cams being connected to and phased to control said operator arms and said device included in said means for moving said member in predetermined timed relationship during each stroke of said premeasuring and insertion arm.

29. In a machine as in claim 28, mechanisms as claimed including severing means for severing said lengths, and a cam on said shaft connected to and for operating said severing means in timed relation during said strokes.

30. In a machine as in claim 28, mechanisms as claimed including means for supplying said continuous strip to said premeasuring and insertion arm, and a cam on said shaft connected to and operating said means for supplying in timed relation during said strokes.

31. A machine as in claim 30, in which said means comprises a reciprocatable material advancing supply arm controlled by the latter cam for supplying said material to said premeasuring and insertion arm in timed relation to its cyclic strokes, and means controlled by said compensator mechanisms for progressively increasing the stroke length of said supply arm as said lengths are progressively increased.

32. In a machine as in claim 26, a reciprocatable material advancing supply arm controlled by said control devices for supplying material to said premeasuring and insertion arm in timed relation to its cyclic strokes, and means operable in timed relation to said device adapted to move said member a predetermined distance for progressively increasing the stroke length of said supply arm as said lengths are progressively increased.

33. In a machine for winding progressively increasing lengths of sheet-like material into coil form, material premeasuring and insertion mechanisms adapted cyclically to receive a continuous strip of said material, premeasure and sever a predetermined length therefrom and insert said length into a rotating coil form, comprising a substantially U-shaped premeasuring and insertion arm having the outer ends of its side arms mounted for rotation about on an axis, a movable member confined to slide between and in positions generally parallel to said side arms and adapted to engage said arm at selectable positions longitudinally of said axis for rotating said arm about said axis, means for sliding said member longitudinally of said axis, a lever extending between said side arms generally parallel to said axis and slideably connected intermediate its ends to said slideable member for rotating the same by lever action about the ends of said lever thereby to rotate said arm, a material premeasuring operator arm and a material insertion operator arm each generally rotatable in the direction of rotation of said premeasuring and insertion arm and each pivotally engaging one of the ends of said lever and constituting a pivot point for rotation of said lever by the other operator arm, and control devices for successively rotating first said premeasuring operator arm and then said insertion operator arm whereby said lever may cause said material premeasuring and insertion arm first to rotate about said axis from a material receiving position to a material premeasuring position to premeasure one of said lengths and then to rotate further about said axis to an insertion position to insert said one of said lengths into a coil form, said control devices including means for thereafter rotating said operator arms to rotate said premeasuring and insertion arm back to said receiving position whereby the rotation thereof may be repeated in successive cyclic strokes.

34. In a machine as in claim 33, means included within said control devices for causing said insertion operator arm to rotate in a direction opposite to its rotation during the successive rotations of said operator arms at the time said premeasuring operator arm begins to rotate and by an amount sufficient to maintain the said point of engagement between said movable member and lever substantially stationary with respect to said axis when said movable member is at its extreme position along said lever in the direction of said insertion operator arm.

35. In a machine as in claim 33, means included within said control devices for causing both said operator arms to rotate in unison after and in the direction of their motions during their successive motions.

36. In a machine as in claim 33, mechanisms as claimed in which said means for sliding said member longitudinally of said axis includes a device movable generally in the direction of said axis and adapted so to slide said member a predetermined distance for each stroke of said premeasuring and insertion arm whereby said slideable member constitutes a pivot for said lever at progressively decreasing distances from said premeasuring operator arm and the distance between said receiving and premeasuring positions is progressively increased on successive such strokes.

37. In a machine as in claim 36 including a stationary structure and a rotatable member thereon adapted to hold a coil form for winding, a reciprocatable member for guiding the winding of solenoidal wire windings on said coil form, a supporting structure supporting the latter reciprocatable member and the claimed premeasuring and insertion mechanisms and pivotally mounted on said stationary structure to rotate with respect to said rotatable member whereby to vary the distance between said rotatable member and said reciprocatable member and said insertion position, and compensator mechanisms for progressively increasing the distances from said rotatable member to said reciprocatable member and insertion position, said compensator mechanisms comprising a variable linkage interconnecting said supporting structure and stationary structure, and a connection between said linkage and said device included in said means for sliding said movable member longitudinally of said axis, said connection being so constructed and arranged as to actuate said linkage to rotate said supporting structure with respect to said stationary structure a predetermined distance for each stroke of said premeasuring and insertion arm.

38. In a machine as in claim 37, mechanisms as claimed in which said control devices include means for so moving said device included in said means for sliding said movable member, and said control devices comprise a continuously rotatable shaft on said supporting structure rotatable in timed relation to said reciprocatable member and having a plurality of cams thereon, said cams being connected to and phased to control said operator arms and said device included in said means for sliding said movable member in predetermined timed relationship during each stroke of said premeasuring and insertion operator arm.

39. In a machine as in claim 38, mechanisms as claimed including severing means on said supporting structure for severing said lengths, and a cam on said shaft connected to and for operating said severing means in timed relation during said strokes.

40. In a machine as in claim 38, mechanisms as claimed including a material advancing supply arm on said supporting structure for supplying said continuous strip to said premeasuring and insertion arm, and a cam on said shaft connected to and reciprocating said supply arm in timed relation during said strokes.

41. A machine as in claim 40, including means controlled by said compensator mechanisms for progressively increasing the stroke length of said supply arm as said lengths are progressively increased.

42. In a machine as in claim 36, a reciprocatable material advancing supply arm controlled by said control devices for supplying material to said premeasuring and insertion arm in timed relation to its cyclic strokes, and means operable in timed relation to said device adapted to slide said member a predetermined distance for progressively increasing the stroke length of said supply arm as said lengths are progressively increased.

JAMES E. BANCROFT.

References Cited in the file of this patent

UNITED STATES PATENTS

| Number | Name | Date |
|---|---|---|
| 1,955,764 | Saltzman | Apr. 24, 1924 |
| 1,966,494 | Franks | July 17, 1934 |
| 2,029,577 | Le Boeuf | Feb. 4, 1936 |
| 2,316,408 | Dawson | Apr. 13, 1943 |
| 2,528,386 | Napper | Oct. 31, 1950 |
| 2,533,717 | Coursey | Dec. 12, 1950 |
| 2,542,303 | Bosh et al. | Feb. 20, 1951 |